United States Patent
Morikawa

(10) Patent No.: US 7,747,964 B2
(45) Date of Patent: Jun. 29, 2010

(54) OPERATION UNIT FOR AN IMAGE FORMING APPARATUS

(75) Inventor: Hiroshi Morikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1226 days.

(21) Appl. No.: 10/822,674

(22) Filed: Apr. 13, 2004

(65) Prior Publication Data

US 2004/0189705 A1 Sep. 30, 2004

Related U.S. Application Data

(60) Continuation of application No. 10/127,760, filed on Apr. 23, 2002, now Pat. No. 6,741,269, which is a division of application No. 09/219,890, filed on Dec. 24, 1998, now Pat. No. 6,952,542.

(30) Foreign Application Priority Data

Dec. 26, 1997 (JP) .................................. 9-360932

(51) Int. Cl.
*G06F 3/00* (2006.01)
(52) U.S. Cl. .......................... 715/781; 715/792; 399/81
(58) Field of Classification Search ................. 715/781, 715/792, 793, 764, 700, 771, 961, 965, 970, 715/702, 772, 777, 827; 399/81
See application file for complete search history.

(56) References Cited

U.S. PATENT DOCUMENTS

| | | |
|---|---|---|
| 4,448,515 A | 5/1984 | Ishikawa |
| 4,619,514 A | 10/1986 | Ide |
| 4,910,552 A | 3/1990 | Migita et al. |
| 4,970,549 A | 11/1990 | Yoshizuka et al. |
| 5,012,280 A | 4/1991 | Tsutsumi |
| 5,061,958 A | 10/1991 | Bunker et al. |
| 5,390,005 A | 2/1995 | Kimoto et al. |
| 5,434,650 A | 7/1995 | Nakahara et al. |
| 5,467,170 A | 11/1995 | Wilson et al. |
| 5,602,625 A | 2/1997 | Okamoto et al. |
| 5,717,977 A | 2/1998 | Suzuki et al. |
| 5,722,029 A | 2/1998 | Tomidokoro et al. |
| 5,812,900 A | 9/1998 | Hashimoto et al. |
| 5,838,325 A | 11/1998 | Deen et al. |
| 5,848,326 A | 12/1998 | Komuro et al. |
| 5,880,851 A | 3/1999 | Imada |
| 5,907,319 A | 5/1999 | Hashimoto et al. |
| 5,937,232 A * | 8/1999 | Taguchi et al. ................. 399/81 |
| 5,950,045 A | 9/1999 | Nomura et al. |

(Continued)

FOREIGN PATENT DOCUMENTS

JP 8-30151 2/1996

(Continued)

*Primary Examiner*—Sy D Luu
(74) *Attorney, Agent, or Firm*—Oblon, Spivak, McClelland, Maier & Neustadt, L.L.P.

(57) ABSTRACT

A readable operation unit for an image forming apparatus displays items representative of various functions relating to image formation while classifying and dividing them on a switchable screen. The operator can therefore easily understand the contents of operation in relation to the other functions despite that the functions are arranged in a hierarchical construction. Further, the operator can grasp the kind of image data and how the image data are processed and output as a single flow.

34 Claims, 25 Drawing Sheets

U.S. PATENT DOCUMENTS

| | | | |
|---|---|---|---|
| 6,023,593 A | 2/2000 | Tomidokoro | |
| 6,296,243 B1 | 10/2001 | Nishimura | |
| 6,353,482 B1 | 3/2002 | Abe et al. | |
| 7,130,066 B1 * | 10/2006 | Kanematu | 358/1.15 |

FOREIGN PATENT DOCUMENTS

| | | |
|---|---|---|
| JP | 8-95439 | 4/1996 |

* cited by examiner

OPERATION UNIT FOR AN IMAGE FORMING APPARATUS

BACKGROUND OF THE INVENTION

The present invention relates to a copier, printer facsimile apparatus or similar image forming apparatus and more particularly to an operation unit including a readable screen for displaying various functions available with an image forming apparatus.

It is a common practice to arrange on, e.g., an electrophotographic machine an input device for allowing the operator to input various copying conditions as well as other conditions. The input device includes a print start key for starting a copying operation, a stop key for stopping it, numeral keys for inputting, e.g., a desired number of copies, and a magnification set key for setting a desired magnification.

Recent diffusion of microcomputers and extension of functions available therewith have implemented various kinds of copiers capable of executing various kinds of control with microcomputers. A microcomputer-controlled copier is capable of easily controlling a sophisticated copying process with a control program. Further, various functions including a function of displaying simple faults, e.g., the absence of papers and paper jams and a function of displaying the number of copies output have been added to the copier, making the most of the merits of a microcomputer. An advanced copier is capable of producing duplex copies each carrying images on both sides thereof, capable of sorting copies one by one, or capable of interrupting a copying operation under way, executing another copying operation, and resuming the previous copying operation after the completion of the interrupt copying operation. This kind of copier not only promotes convenient use, but also enhances efficiency.

Different keys are assigned to the above various functions while different information relating to the functions are displayed on a screen. The number of keys to be operated and the number of information to be displayed naturally increase with an increase in the number of functions available with the apparatus. It is, however, difficult to arrange all of the keys and screen in a limited flat area available on the top of the casing of the apparatus. Should the keys and screen be reduced in size in order to be accommodated in the limited area, they would be difficult to operate. Moreover, a number of keys arranged on the limited area would make the operation appear troublesome to perform. This is particularly true with a dual machine having a combined copier and facsimile function or a combined copier and printer function, and a multiplex machine having a combined copier, facsimile and printer function.

In light of the above, there has recently been put to practical use an image forming apparatus including mechanical keys implementing only a start key, numeral keys and other basic keys and a touch panel implementing set keys and operation keys relating to various functions. The touch panel uses liquid crystal and selectively displays different key portions. Specifically, the apparatus displays information on a branched function step basis in order to make the screen readable, i.e., arranges function keys in a hierarchical fashion. In addition, icons and pop-up pictures as well as devised screen layout are used for reducing troublesome manipulation.

However, the problem with the touch panel scheme is that when the operator performing a sequence of setting steps desires to change any condition already set, the operator must sequentially switch the screen until a function step including the desired condition appears, and then change the condition. This operation is extremely troublesome to perform.

SUMMARY OF THE INVENTION

It is therefore an object of the present invention to provide a readable operation unit for an image forming apparatus capable of promoting, while arranging functions hierarchically, the easy understanding of the contents of operation in relation to the other conditions and thereby enhancing the operator's total recognition of the set contents.

In accordance with the present invention, in an operation unit for an image forming apparatus for executing at least a part of various functions relating to image formation hierarchically by switching a screen, items representative of the various functions are displayed on the screen while being classified and divided from each other.

BRIEF DESCRIPTION OF THE DRAWINGS

The above and other objects, features and advantages of the present invention will become more apparent from the following detailed description taken with the accompanying drawings in which:

While FIGS. 3-25 show various information in Japanese, the information may, of course, be shown in any other language.

DESCRIPTION OF THE PREFERRED EMBODIMENT

Figure 1:
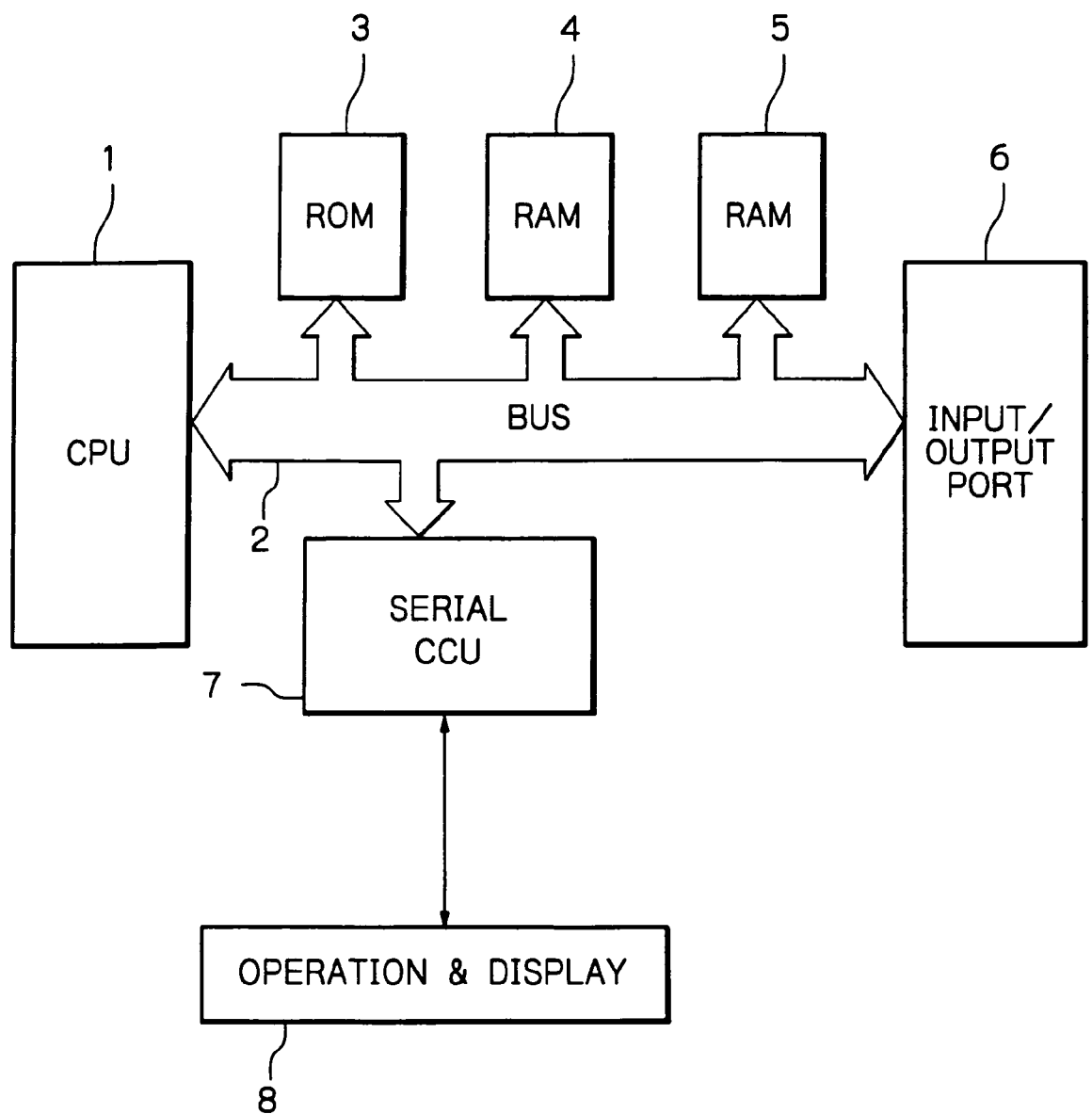
FIG. 1 is a block diagram schematically showing a control system included in an image forming apparatus to which an operation unit embodying the present invention is applied.

Referring to FIG. 1 of the drawings, a control system included in an image forming apparatus is shown and includes an operation and display section 8. The operation and display section 8 is representative of an operation unit embodying the present invention. As shown, a microprocessor 1 is connected to a ROM (Read Only Memory) 3, a RAM (Random Access Memory) 4, a nonvolatile RAM (NVRAM) 5, and I/O (Input/Output) port 6 and a serial CCU (Communication Control Unit) 7 by an address, data and control bus 2. The microprocessor 1 executes a program assigned to the image forming apparatus. The I/O port 6 is connected to motors, solenoids and other output loads and sensors arranged in the image forming apparatus. The serial CCU 7 interchanges signals with the operation and display section 8.

Figure 2:
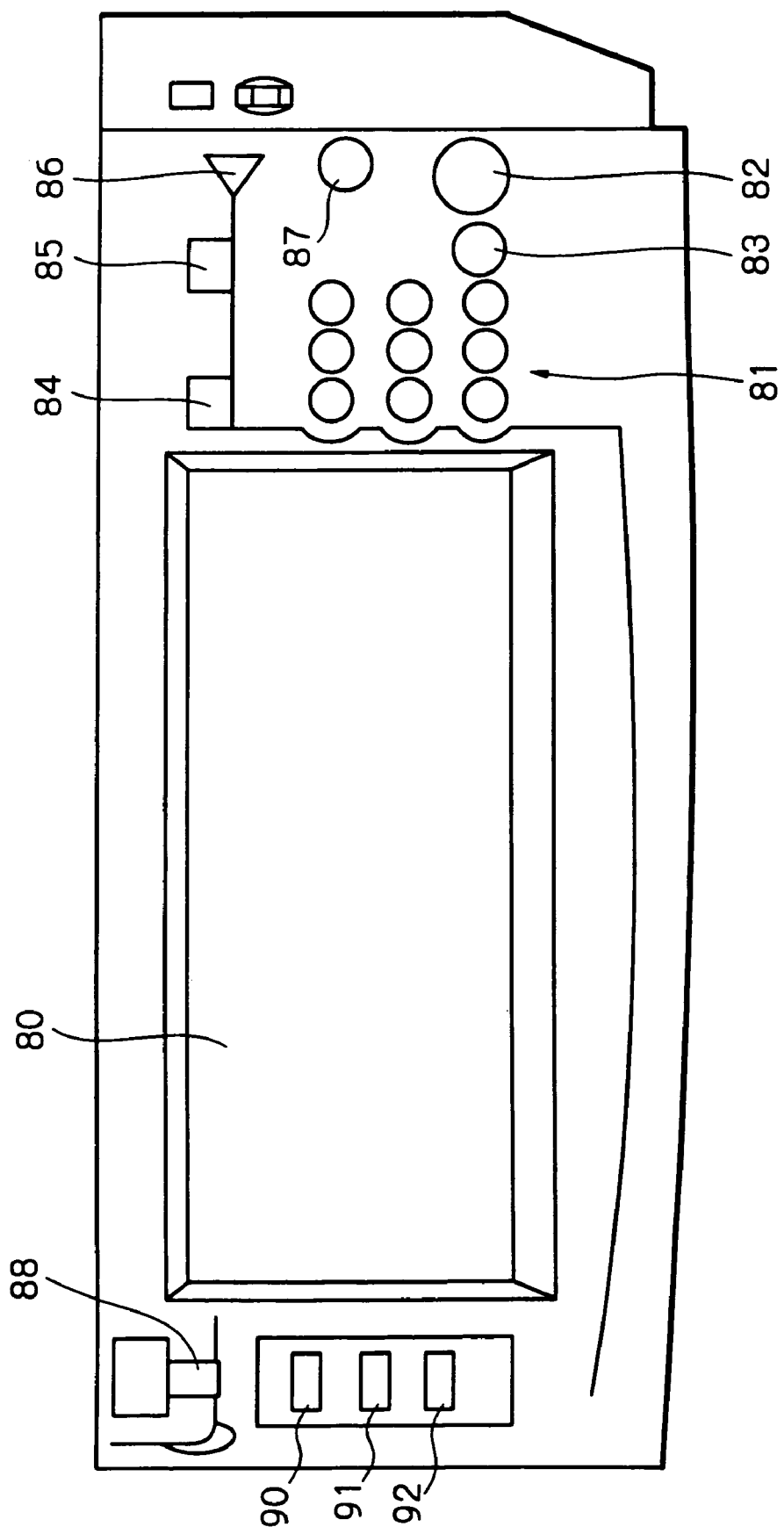
FIG. 2 is a plan view showing a specific configuration of the operation unit.

FIG. 2 shows a specific configuration of the operation and display section 8. As shown, a touch panel type screen 80 is positioned at substantially the center of the section 8 for displaying the statuses of the apparatus and messages. The screen 80 is implemented by a touch panel and an LCD (Liquid Crystal Display). Circuitry for detecting touch panel keys and a coordinates detecting method are conventional and will not be described specifically. Numeral keys and an enter key (#) 81 are arranged at the right-hand side of the screen 80. A start key 82 is positioned at the right-hand side of the numeral keys 81 and implemented as a disk greater in diameter than the numeral keys 81. A clear/stop key 83 is interposed between the numeral keys and enter key 81 and the start key 82 for canceling a numerical value input or interrupting or ending a copying operation. Arranged above the numeral keys and enter key 81 are a program key 84, a reset/preheat key 85, and an interrupt key 86. A trial copy key 87 is positioned beneath the interrupt key 86. When a plurality of copies are desired, a trial or first copy may be produced in order to determine the quality of the image. A set/counter key 88 is located at the top left of the screen 80 for varying initial set values and operating conditions in accordance with the conditions of use. A copy function key 90, a copy server function key 91 and a printer function key 92 are positioned at the left-hand side of the screen 80 and beneath the set/counter key 88. With these keys 90-92, the apparatus is capable of selectively functioning as a copier, a copy server or a printer, as desired. The mechanical configuration and operation of the apparatus including such an operation and display section are conventional and will not be shown or described specifically. While the operation and display section 8 is applied to a multiplex machine, it is similarly applicable to a copier, facsimile apparatus, printer or similar singular image forming apparatus.

Figure 3:
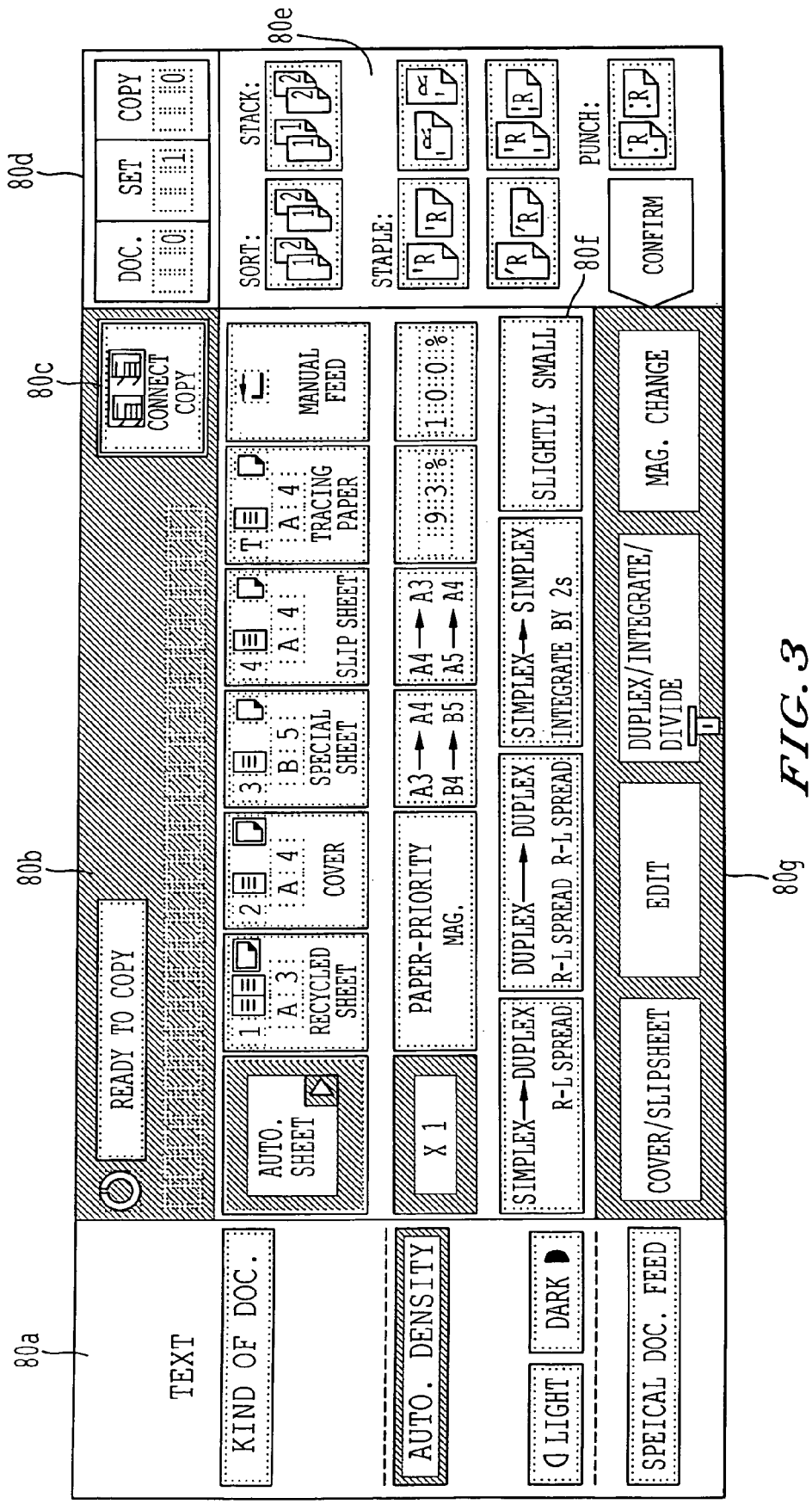
FIG. 3 shows a specific initial picture to appear on a screen or touch panel in a copy mode.
Figure 4:
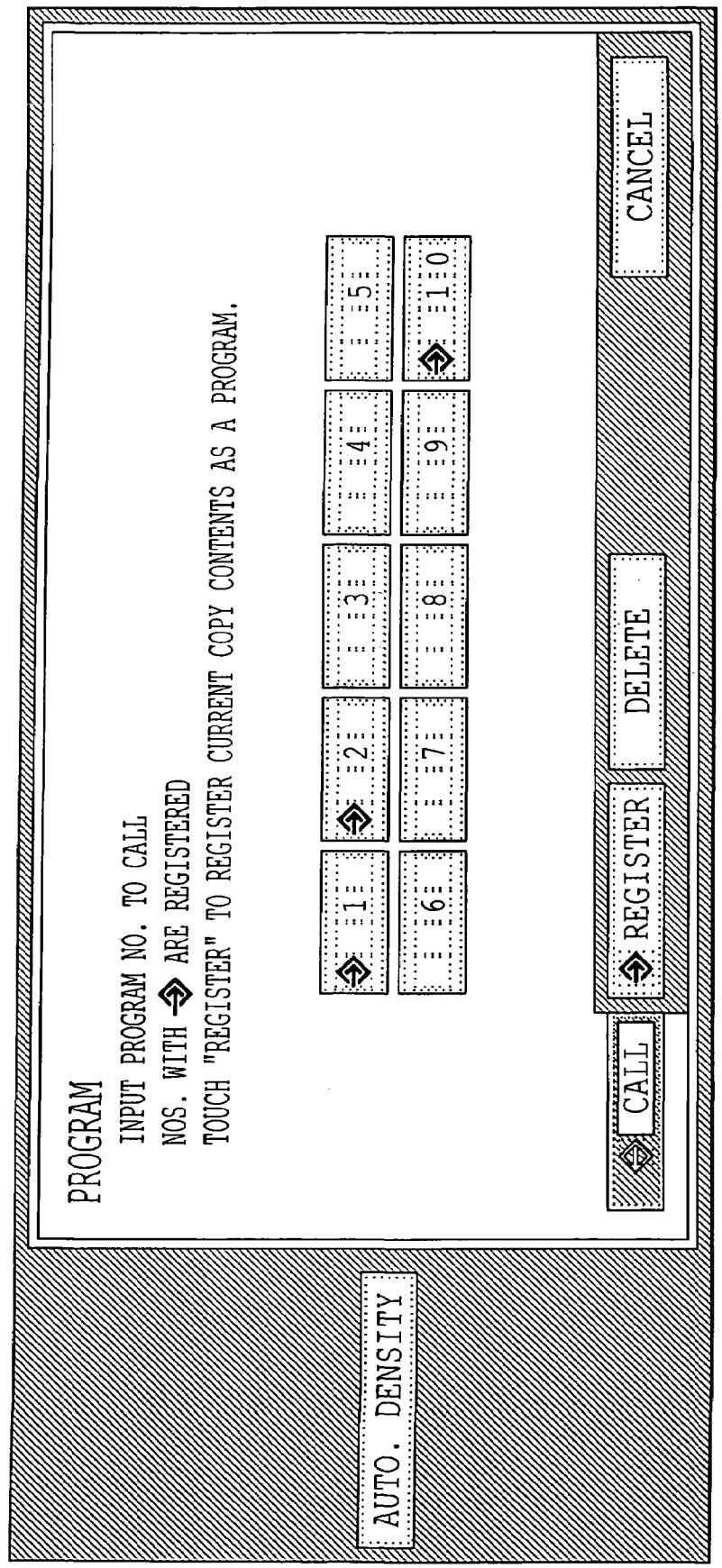
FIG. 4 shows a specific picture to appear on the screen for registering or calling a program.

FIG. 3 shows a specific basic or initial picture to appear on the screen 80, FIG. 2, when the apparatus is operated in a copier mode. As shown, the basic picture includes a first area 80a allowing the operator to input a kind of documents, desired copy density, and special document feed. A second area or message area 80b displays operation statuses and messages including "Ready to copy." shown in FIG. 3. A third area 80c displays the remaining capacity of a memory in percentage or displays a connection copy key when a connection unit is set, as illustrated. A fourth area 80d displays the number of documents written to the memory, the number of documents (sets of documents) set, and the number copies (sets of copies) produced. A fifth area 80e allows the operator to select a sort mode, a stack mode, a staple mode or a punch mode, as desired. A sixth area 80f displays the contents of registered functions that are often used. To register desired functions, the operator presses the program key 84, FIG. 2, in order to call a picture shown in FIG. 4. The picture shown in FIG. 4 allows the operator to register up to ten different functions. A seventh area 80g displays function items (tabs). When the operator touches, e.g., a "Magnification Change" key belonging to a group of function items, a magnification change picture appears from below. If desired, "Manual Feed" that is another function item may appear when a manual feed tray, not shown, is opened.

From the copier operation standpoint, the screen 80 may be divided into a first display section (first area 80a) relating the handling of documents, a second display section relating to the configuration of copies including paper size and magnification change, and a third display section (fifth area 80e). Of course, such display sections may overlap each other, if desired.

Figure 5:
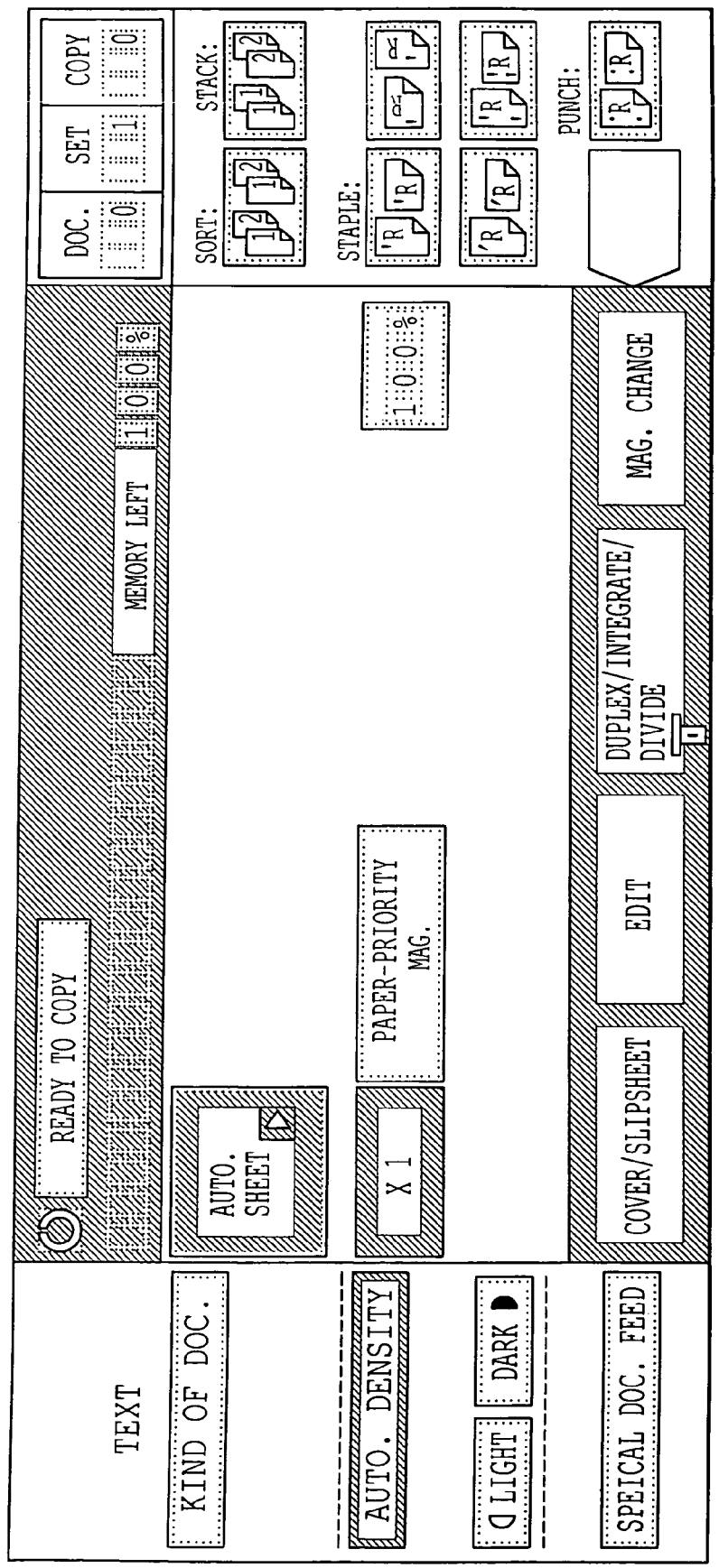
FIG. 5 shows another specific initial picture.

FIG. 5 shows a second basic picture that is a simplified version of the basic picture of FIG. 3 and available for a user desiring limited display. As shown, when the operator gives priority to an automatic paper selecting function at the time of initial setting, an "Auto Paper Selection" key appears, but the kinds of paper trays do not appear. When the operator does not touch the magnification change key in the basic picture, only a "x1" key and a "Paper-Priority Magnification Change" key appear. Further, if the operator does not touch any registered function key, no registered function keys appear. In the specific condition shown in FIG. 5, "Available Memory Capacity" appears in place of the connection copy key because no connection units are set. Even such limited display shows the operator reading conditions, copying conditions and whether or not a finisher is present while classing them into discrete sections in a readable way. The operator can therefore touch any one of such sections while recognizing the conditions of the other sections.

Figure 6:
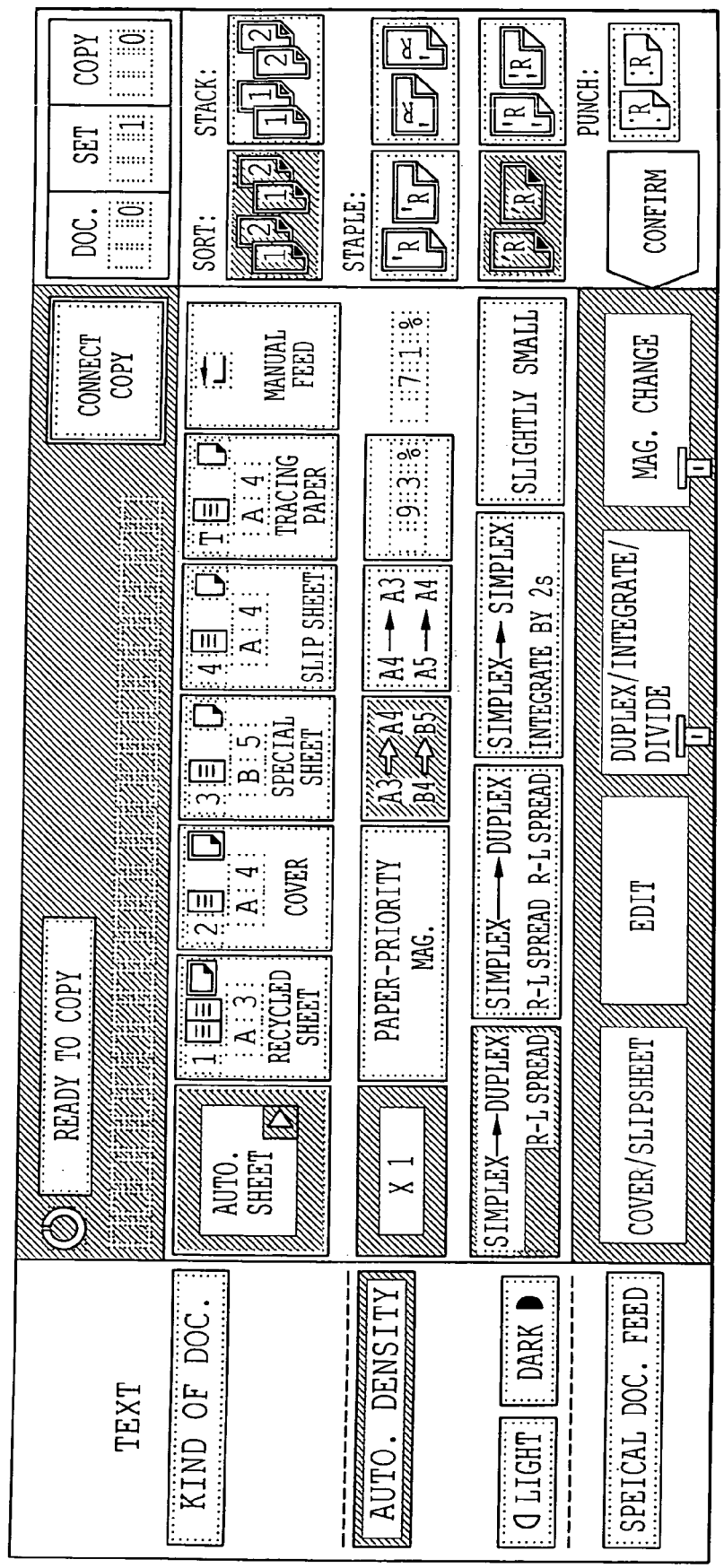
FIG. 6 shows a specific condition in which functions are set.
Figure 7:
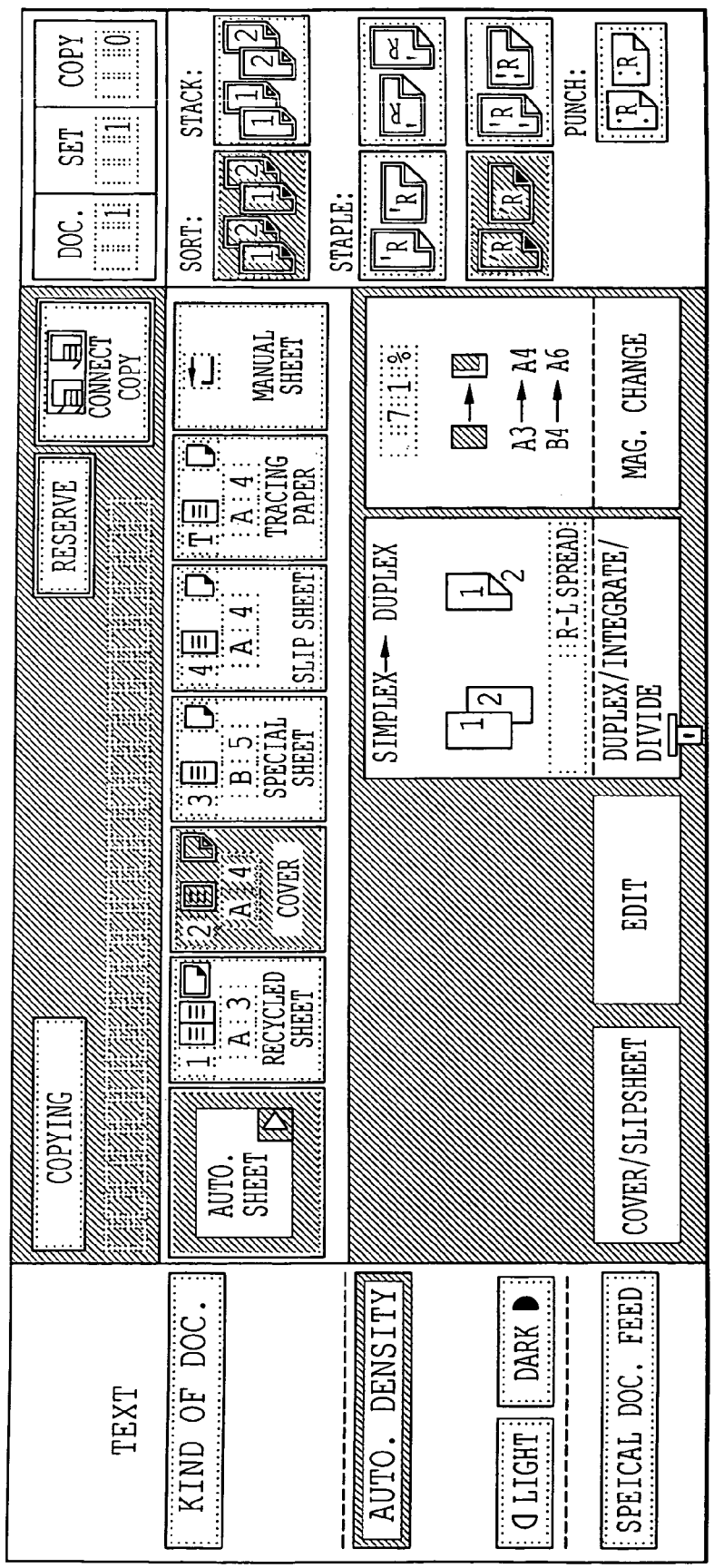
FIG. 7 shows a specific picture to appear during copying.

FIG. 6 shows a specific picture to appear when the operator selects, e.g., reduction "A3→A4/B4→B5", duplex spread copying with simplex documents, sorting, and stapling papers at the top left corner in the basic picture shown in FIG. 3. A "Confirm" key may be caused to appear for the first time in the picture shown in FIG. 6. When the start key 82, FIG. 2, is pressed, a picture shown in FIG. 7 appears. As shown, a message "Copying" is shown in the second area 80b while the contents of magnification change is shown over the sixth area 80f and seventh area 80g. In FIG. 7, a "Reserve" key allows the operator to set the contents of the next copying operation while the current copying operation is under way. Specifically, when the operator touches the "Reserve" key, sets the contents of a reserve copying operation, sets documents on an ADF (Automatic Document Feeder), not shown, and presses the start key, the reserve copying operation begins automatically on the completion of the current copying operation.

Figure 8:
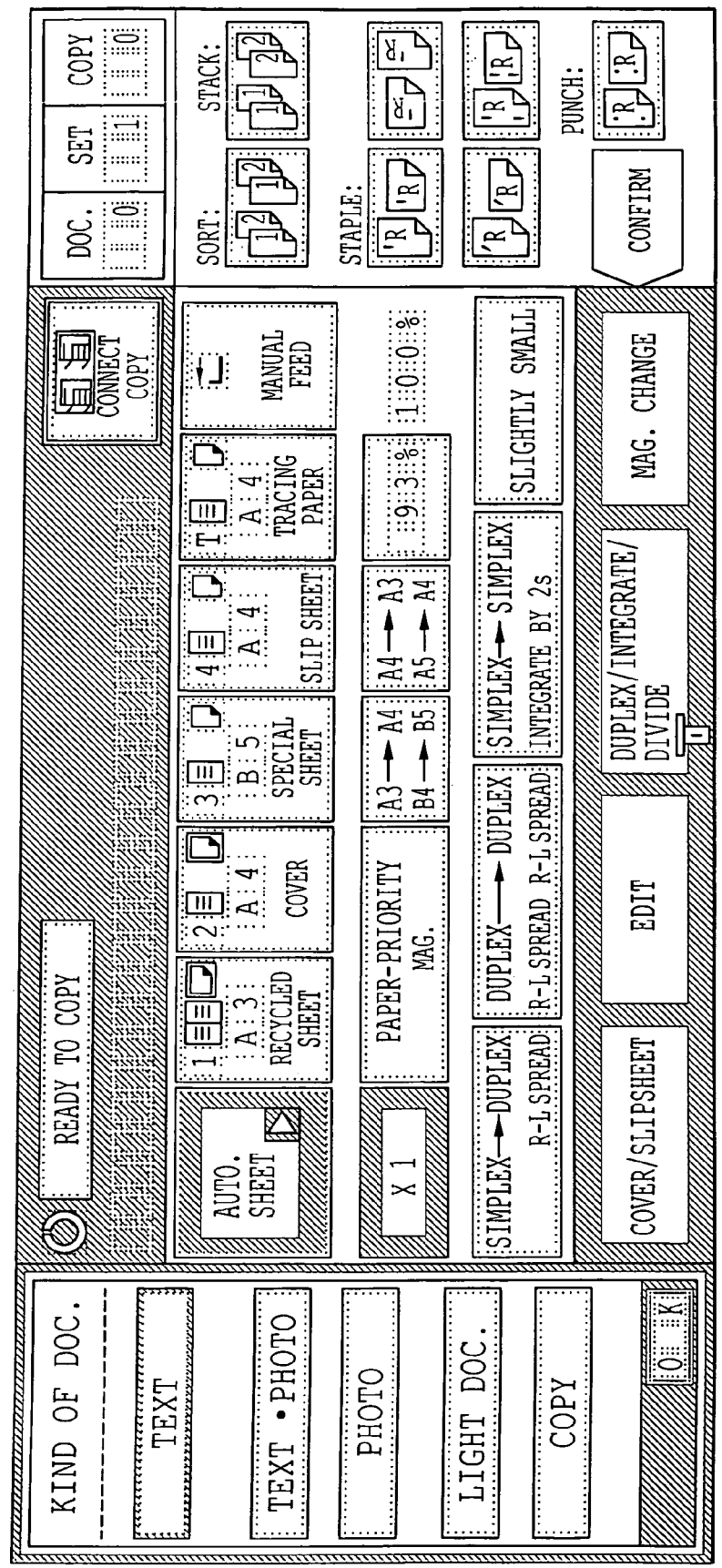
FIG. 8 shows a specific pop-up picture showing the kinds of documents in detail.
Figure 9:
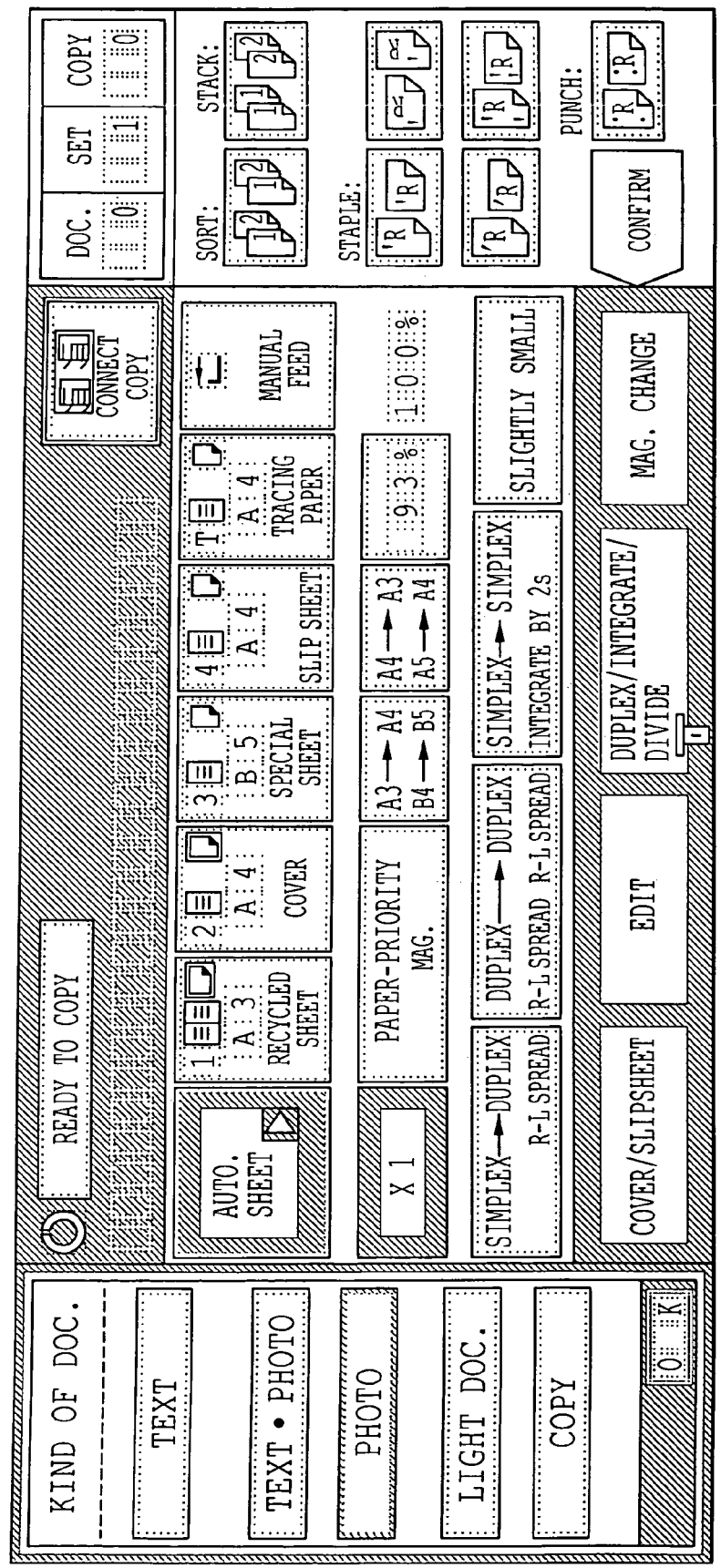
FIG. 9 is identical with FIG. 8 except that "Photo" is highlighted.
Figure 10:
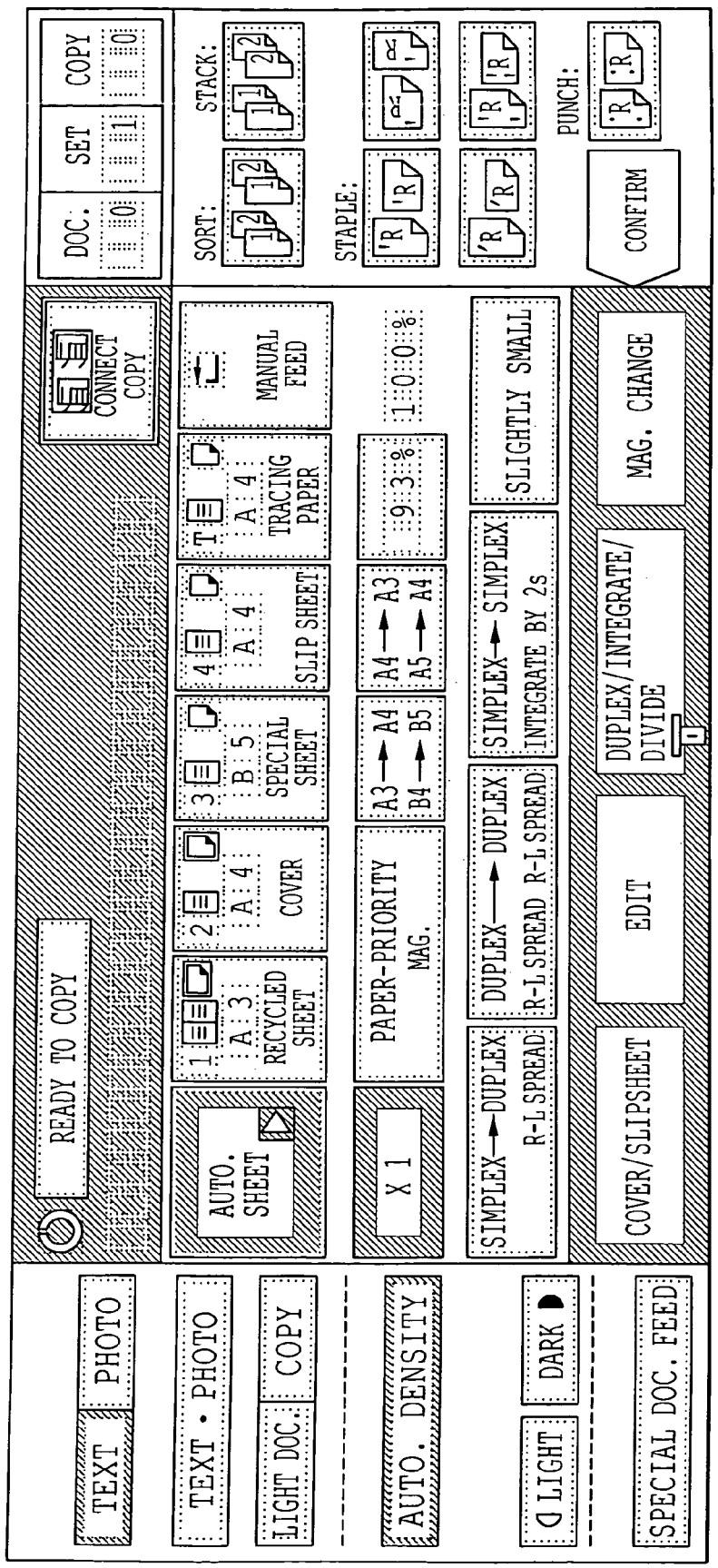
FIG. 10 shows the kinds of documents arranged in the basic picture.

Assume that the operator touches a "Kind of Document" key in the picture shown in FIG. 3 in order to input the kind of documents. Then, a picture shown in FIG. 8 appears, i.e., only the contents of the first area 80a changes. In FIG. 8, a "Text" key is assigned to documents mainly consisting of characters. A "Text/Photo" key is assigned to documents consisting of photos and characters. A "Photo" key is assigned to photos or graphics. A "Light Document" key is assigned to low density documents including documents written in pencil and counterfoils; thin lines apt to appear discontinuous can be faithfully copied. A "Copy" key is assigned to the copies of documents; the thickening and defacing of characters can be reduced. For example, when the operator touches the "Photo" key in the picture of FIG. 8, a picture shown in FIG. 9 appears. When the operator touches an "OK" key in the picture of FIG. 9, the basic picture of FIG. 3 again appears. If the operator does not select "Simplified Display of Kind of Documents" at the time of initial setting, then the kinds of documents are shown in the basic picture, as shown in FIG. 10.

Figure 11:
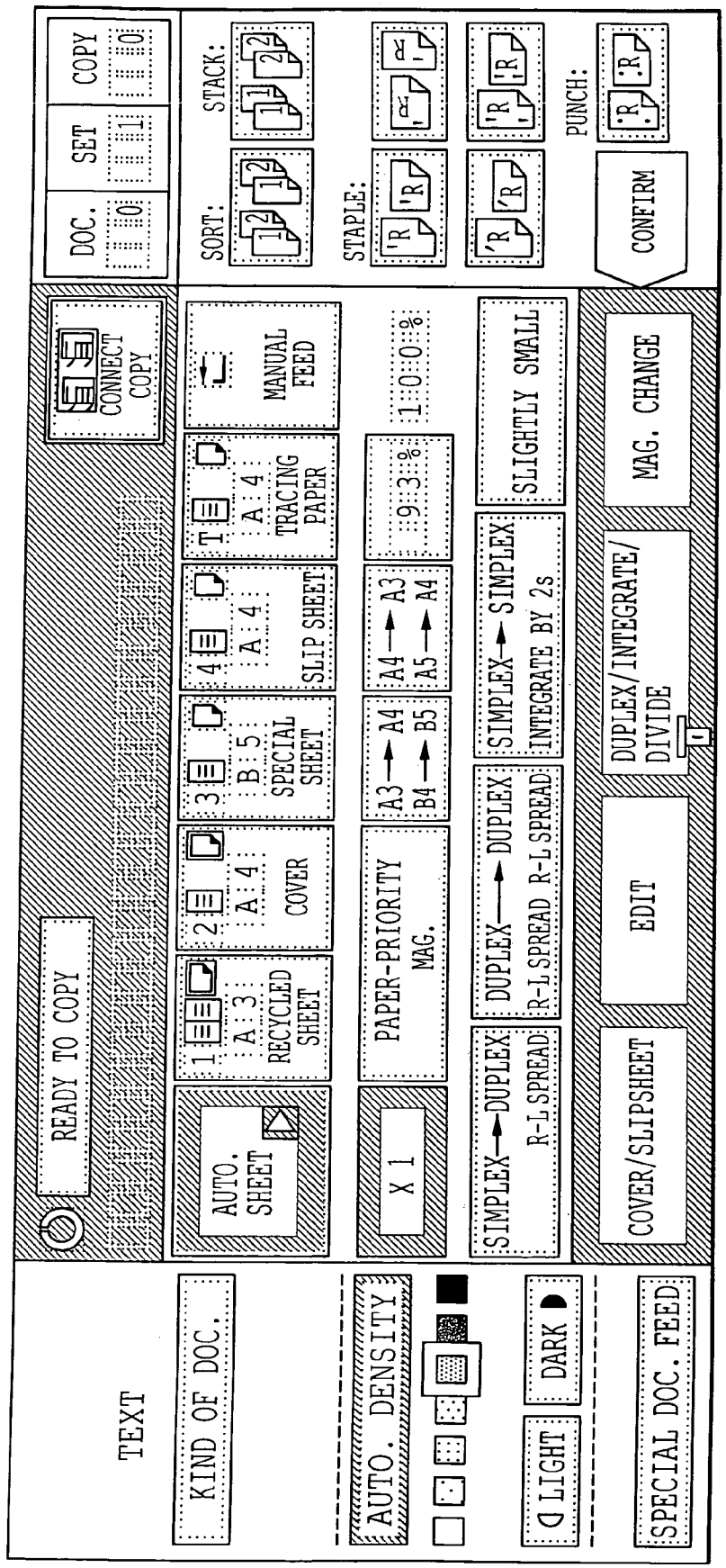
FIG. 11 shows a condition wherein slightly high image density is selected.

As for the density of copies, there are available "Auto Density" for automatically setting adequate image density, "Density Control" for allowing the operator to adjust image density in multiple steps, and "Combined Density Control" for allowing the operator to control only the density of an image printed in a dark background. For "Combined Density Control", in the basic picture of FIG. 3 in which "Auto Density" is highlighted, the operator touches either a "Light" key or a "Dark" key. FIG. 11 shows a picture in which slightly high density is selected in the combined density control condition. In this case, too, only a limited portion of the first area 80a changes and allows the operator to select reading conditions while recognizing the other copying conditions.

Figure 12:
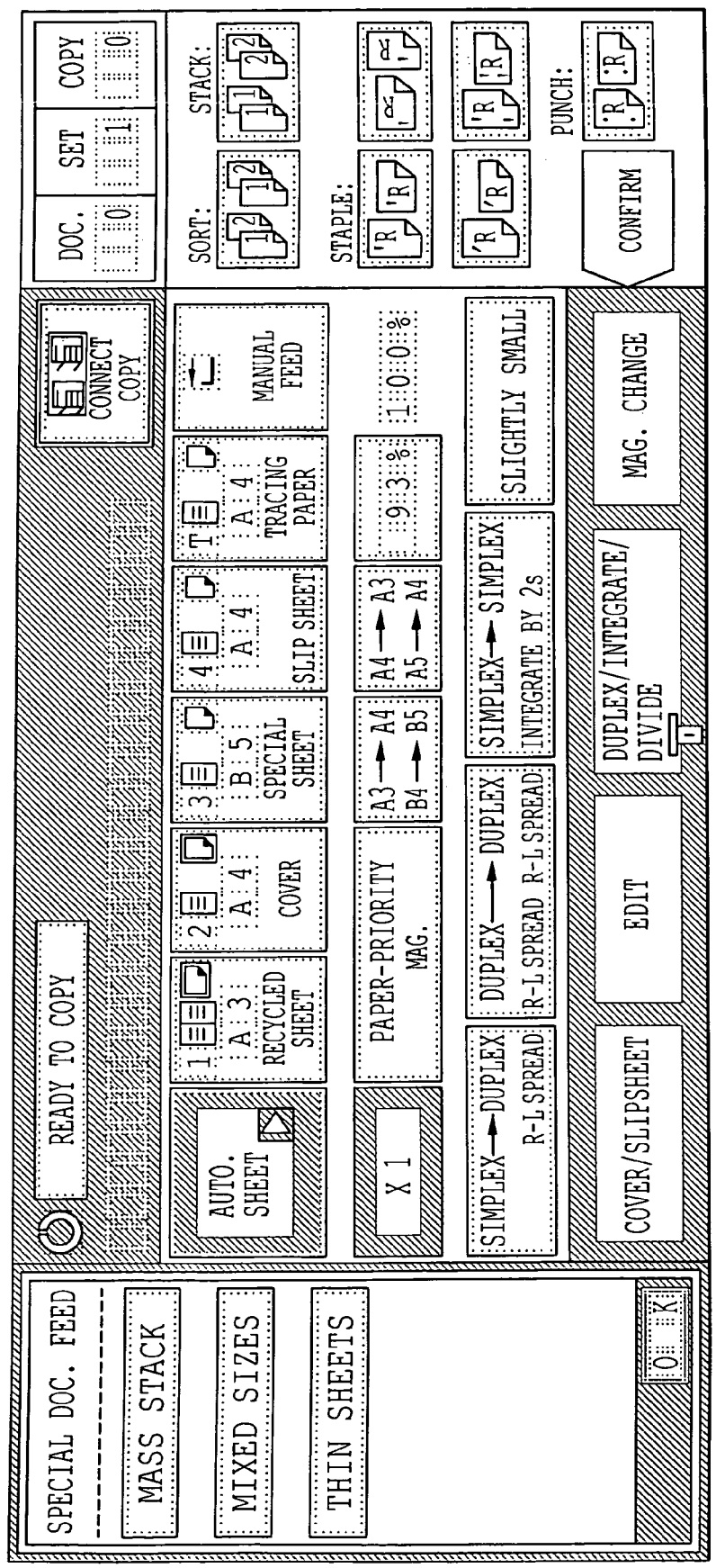
FIG. 12 shows a specific pop-up picture displaying details of special document feed.

As for the ADF, the number of documents that can be stacked is limited, and documents are automatically fed, assuming a standard thickness. To cope with these limitations, the operator may touch the "Special Document Feed" key. As a result, a picture shown in FIG. 12 appears. When the number of documents to be stacked on the ADF is greater than the preselected number of documents, the operator touches a "Mass Documents" key in the picture of FIG. 12. Then, the ADF automatically feeds the documents without forcing the operator to press the start key every time the operator stacks the documents on the ADF. When the operator touches a "Mixed Sizes" key, the ADF feeds a stack of documents of different sizes.

Figure 13:
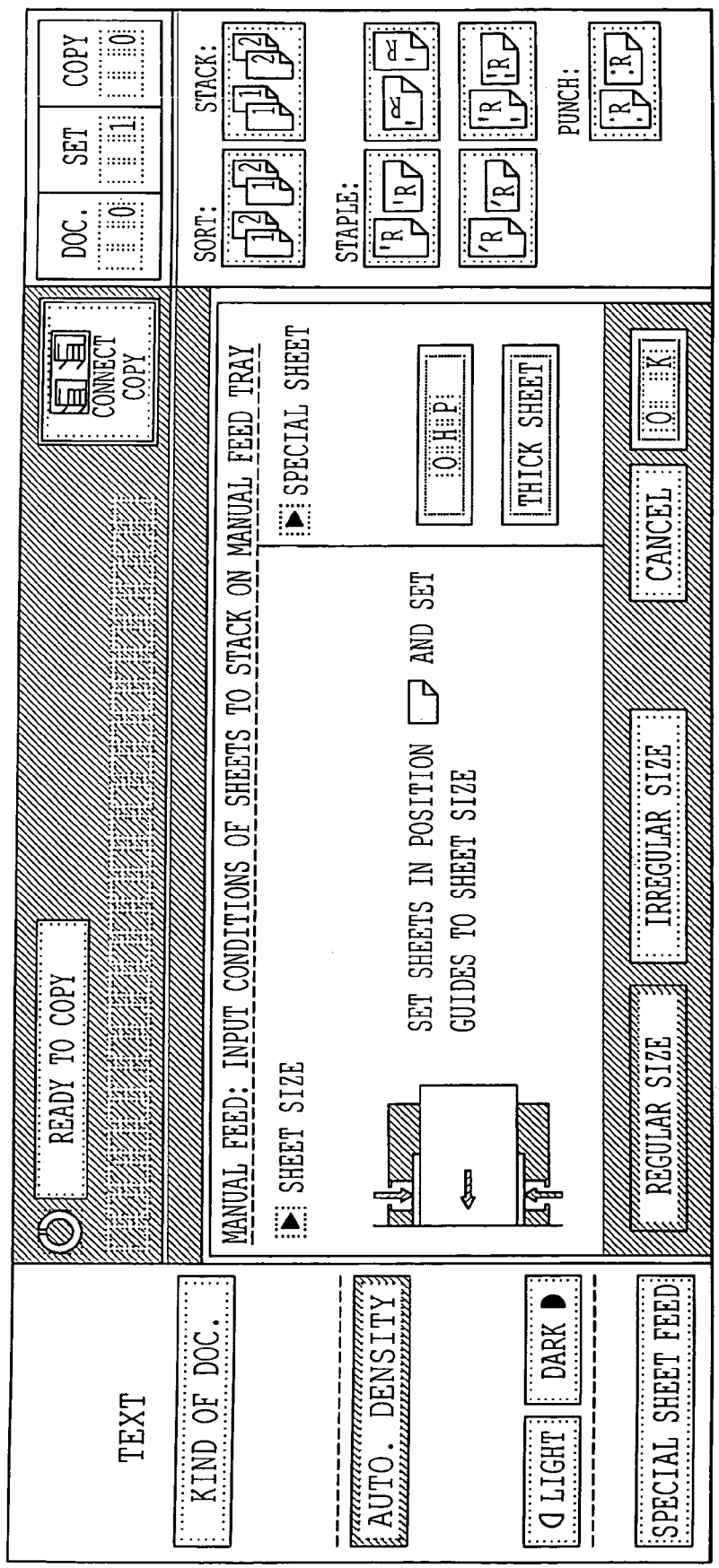
FIG. 13 shows a specific picture to appear at the time of manual paper feed.

Assume that the operator desires to copy any one of documents that cannot be stacked on a feed tray, not shown, postcards or similar relatively thick papers, and OHP (Over Head Projector) films. Then, the operator opens the manual feed tray, touches the "Manual Feed" key, and presses the enter key 81, FIG. 2. As a result, a picture shown in FIG. 13 appears. When use is made of OHP films or thick papers of regular size, the operator touches an "OHP" key or a "Thick Paper" key. When the operator intending to use papers of irregular size touches an "Irregular Size" key, a picture, not shown, allowing the operator to input a vertical size and a horizontal size appears. The operator watching such a picture inputs the vertical and horizontal sizes of the papers on the numeral keys, presses the enter key, and then presses an "OK" key. As a result, the basic picture of FIG. 3 again appears except that the "Irregular Size" key is highlighted in placed of the "Auto Paper Selection" key.

Various kinds of enlargement and reduction are available as a magnification changing function. For example, it is possible to automatically enlarge or reduce the size of images in accordance with the size of papers selected. For this purpose, the operator touches the "Paper-Priority Magnification Change" key in the sixth area 80f, FIG. 3, and then selects papers. When the operator touches a "Slightly Small" key, there is set 93% reduction using the center as a reference. When the operator touches the "Magnification Change" key, a picture shown in FIG. 14 and showing "−", "+", "Numeral Key Zoom", "Reduce", "Enlarge" and "Applied Magnification Change" appears.

Figure 14:
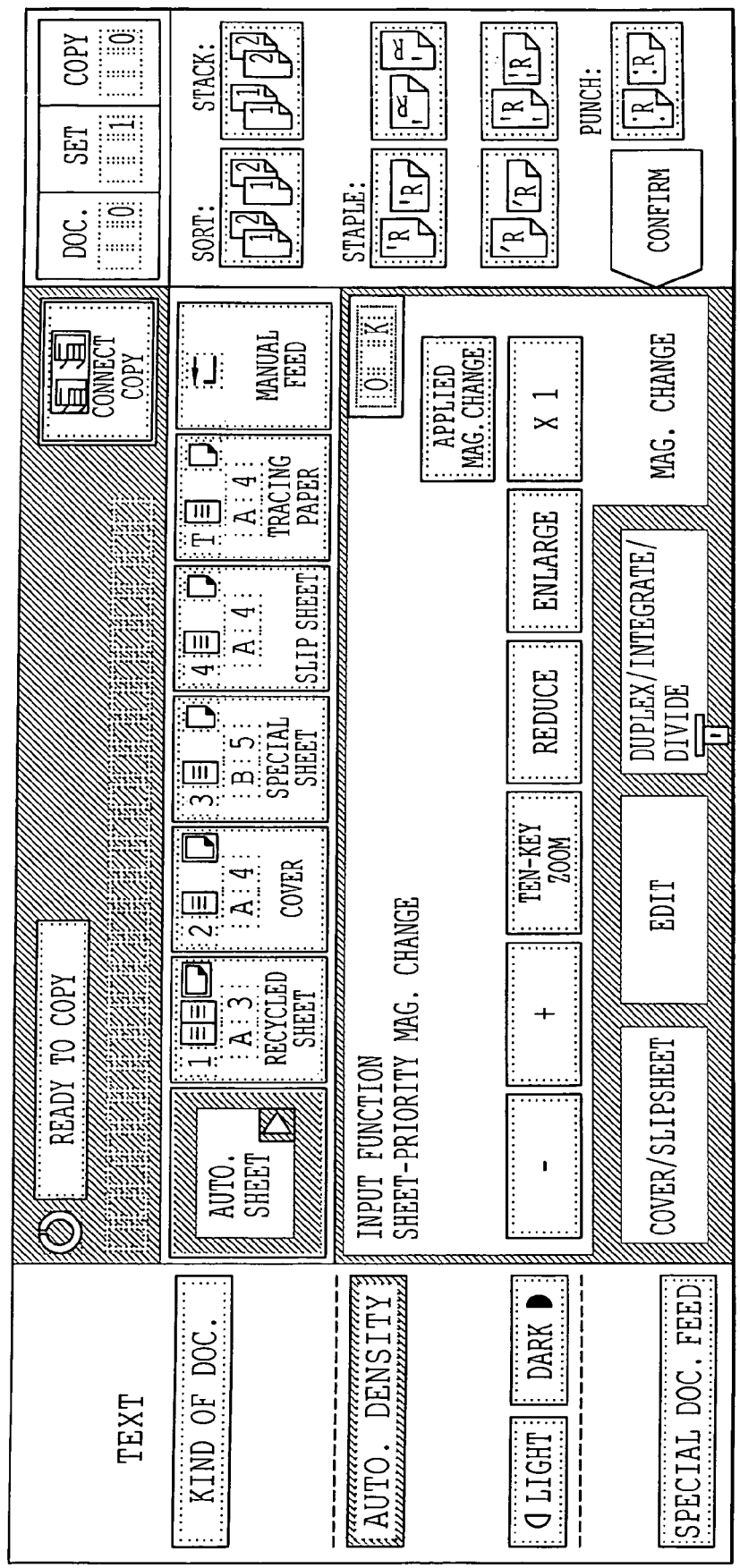
FIG. 14 shows a specific picture for selecting paper-priority magnification change after the selection of an integrated copying function.

Specifically, the picture of FIG. 14 allows the operator to set paper-priority magnification change after setting integrated copying which will be described later. The "Reduce" key or the "Enlarge" key allows the operator to select a regular magnification or fixed magnification (35%, 50%, 61%, 71%, 82%, 87%, 115%, 122%, 141%, 200% and 400%). The "Numeral Key Zoom" allows the operator to reduce or enlarge an image between 32% and 400% on a 1% basis. Alternatively, the operator may touch the "Reduce" key or the "Enlarge" key and then adjust the magnification by using the "−" key or the "+" key. The applied magnification changing function includes "Dimension-Priority Magnification Change", "Independent Magnification Change %", and "Independent Magnification Change mm". The "Dimension-Priority Magnification Change" refers to enlargement or reduction effected by specifying the length of one side of a document and the length of one side of a copy corresponding to each other; a magnification is automatically calculated on the basis of the two lengths. The "Independent Magnification Change %" and "Independent Magnification Change mm" each copies a document in a particular magnification in each of the vertical and horizontal directions.

Figure 15:
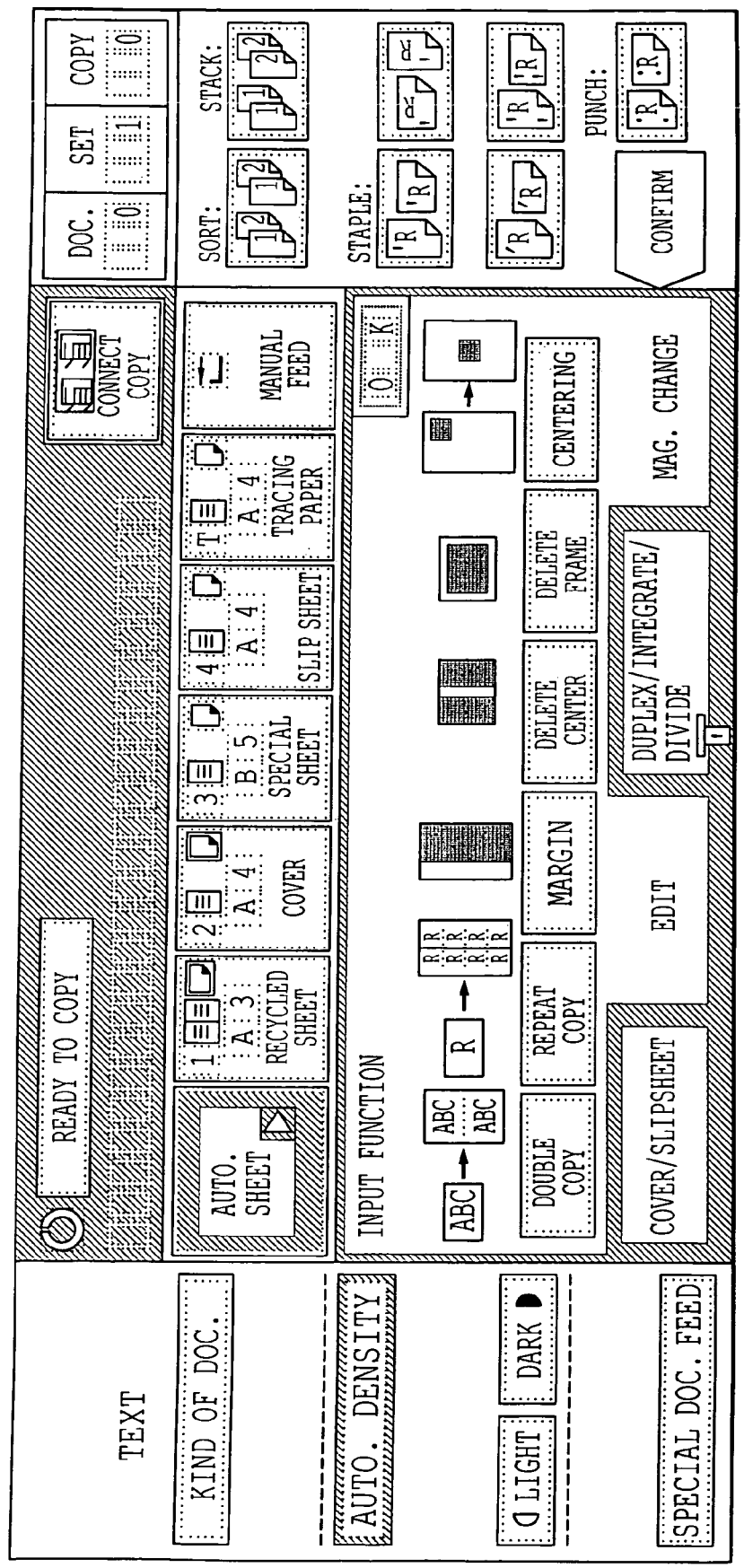
FIG. 15 shows a specific picture for selecting an editing function.
Figure 16:
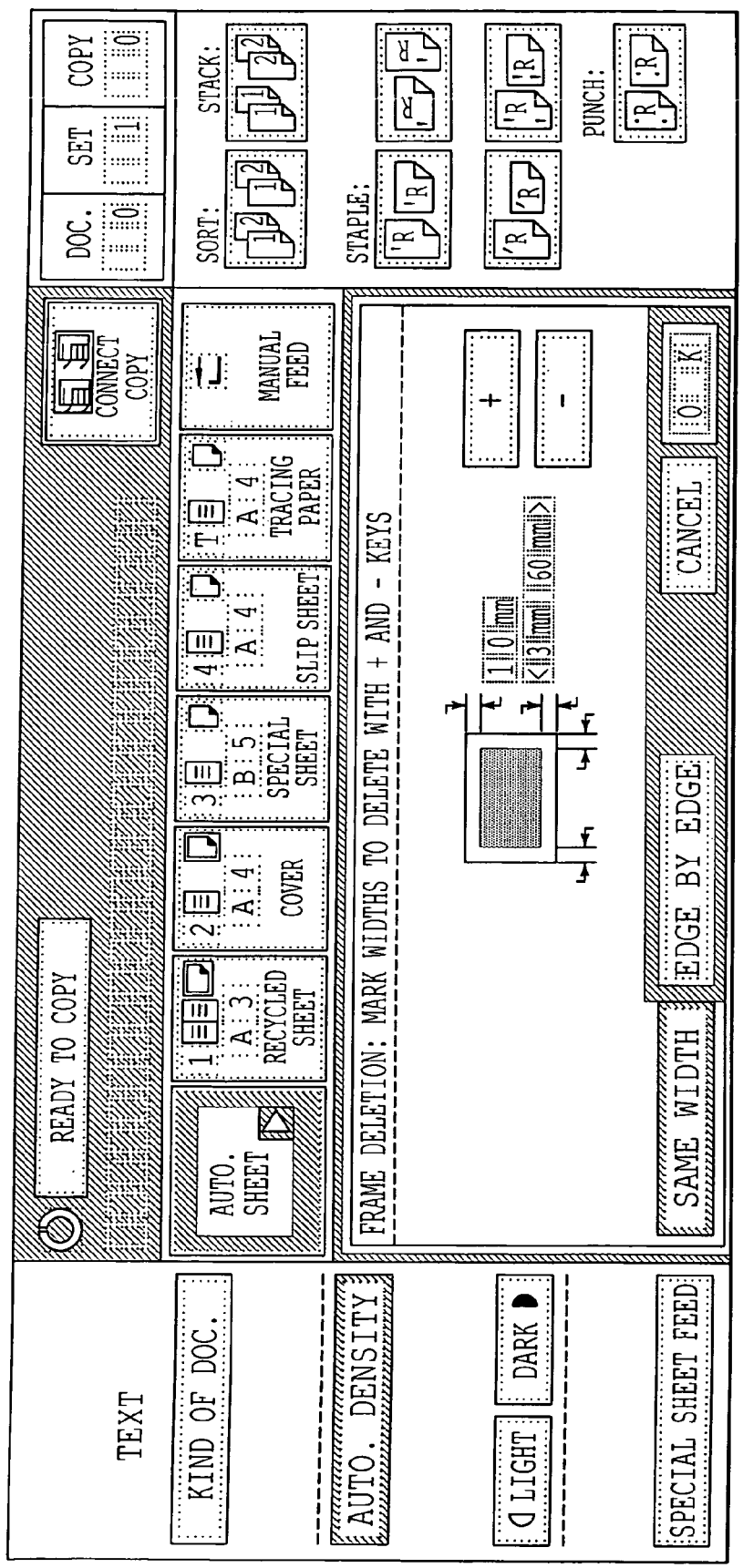
FIG. 16 shows a specific picture for erasing a frame.

The copying conditions include "Edit", "Cover/Slip Sheet" and "Duplex/Integration/Division" in addition to "Magnification Change", as follows. When the operator touches an "Edit" key, an "Edit" picture shown in FIG. 15 appears. As shown, the "Edit" picture includes a "Double Copy" key for producing two copies of a single document at the top and bottom or at the right and left of a single paper. A "Repeat" key allows a plurality of copies of a single document to be produced on a single paper in accordance with the paper size and the magnification selected. A "Margin" key allows the operator to define a margin at the left or the right of a paper by touching "←", "→", "↓" and "↑". A "Center Erase" key is used to erase a shadow appearing at the center of a copy when a book or similar bound document is copied. A "Frame Erase" key is used to erase shadows appearing around a copy derived from a book or similar bound document. With the "Center Erase" or "Frame Erase" key, it is possible to set a desired width for erasure. Particularly, as shown in FIG. 16, the "Frame Erase" key allows the same width or a particular width to be set in each of the vertical and horizontal directions, as desired. A "Centering" key automatically shifts the image of a document to the center of a paper.

Figure 17:
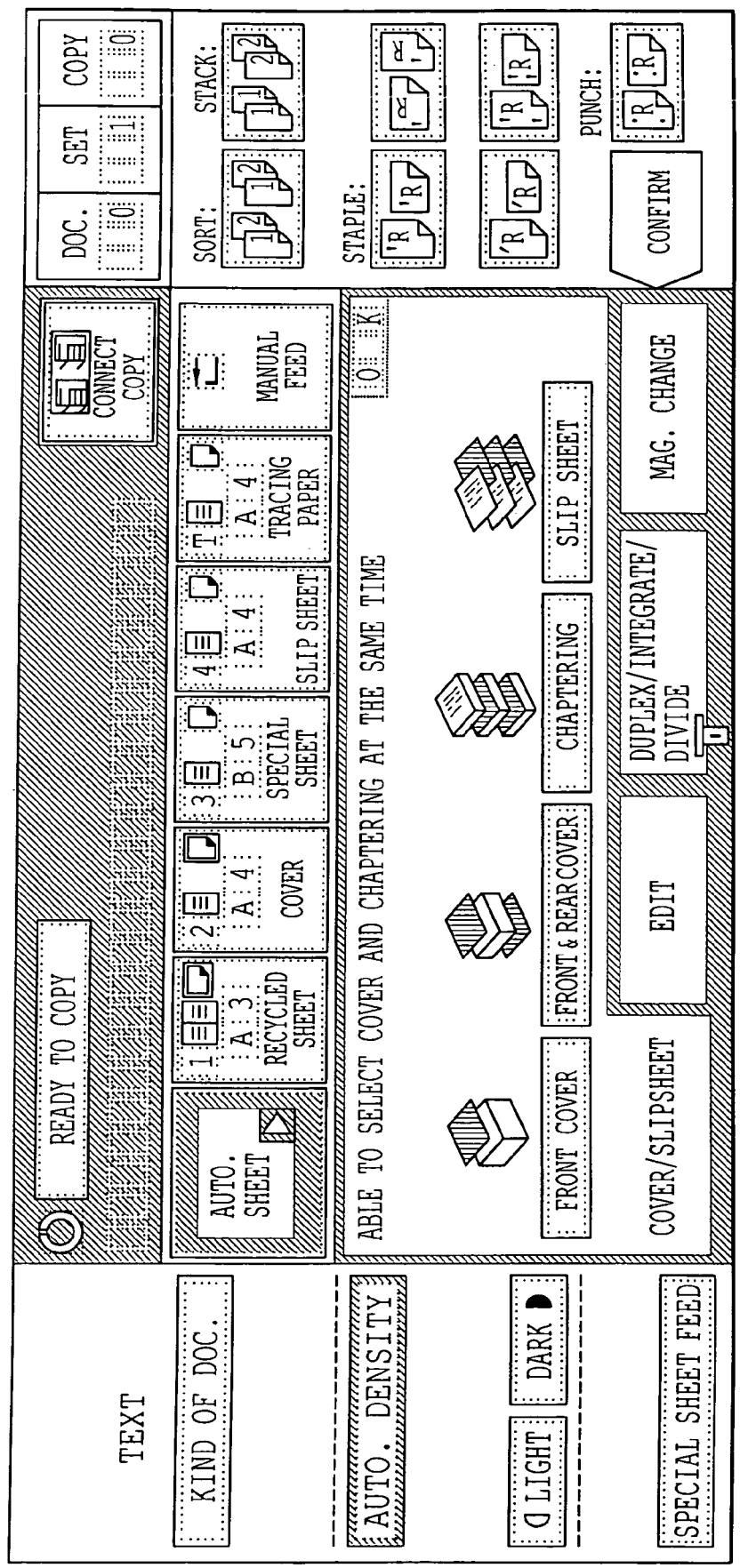
FIG. 17 shows a specific picture for selecting a cover/slip sheet function.

The "Cover/Slip Sheet" key allows documents to be copied on cover papers or allows slip sheets to be inserted between the chapters of documents. Specifically, there are available a "Front Cover" key for copying the first document page on a paper assigned to a front cover, a "Both Covers" key for copying the first and last document pages on two cover papers, respectively, a "Chapter Division" key for inserting slip sheets between the chapters of documents, and a "Slip Sheet" key for inserting slip sheets between the pages of documents. FIG. 17 shows a picture to appear when the operator touches the "Cover/Slip Sheet" key. It is to be noted that when "Simplex→Duplex" copy is selected, "Chapter Division" allows designated documents to be copied on the front sides of papers like the first document page without exception.

Figure 18:
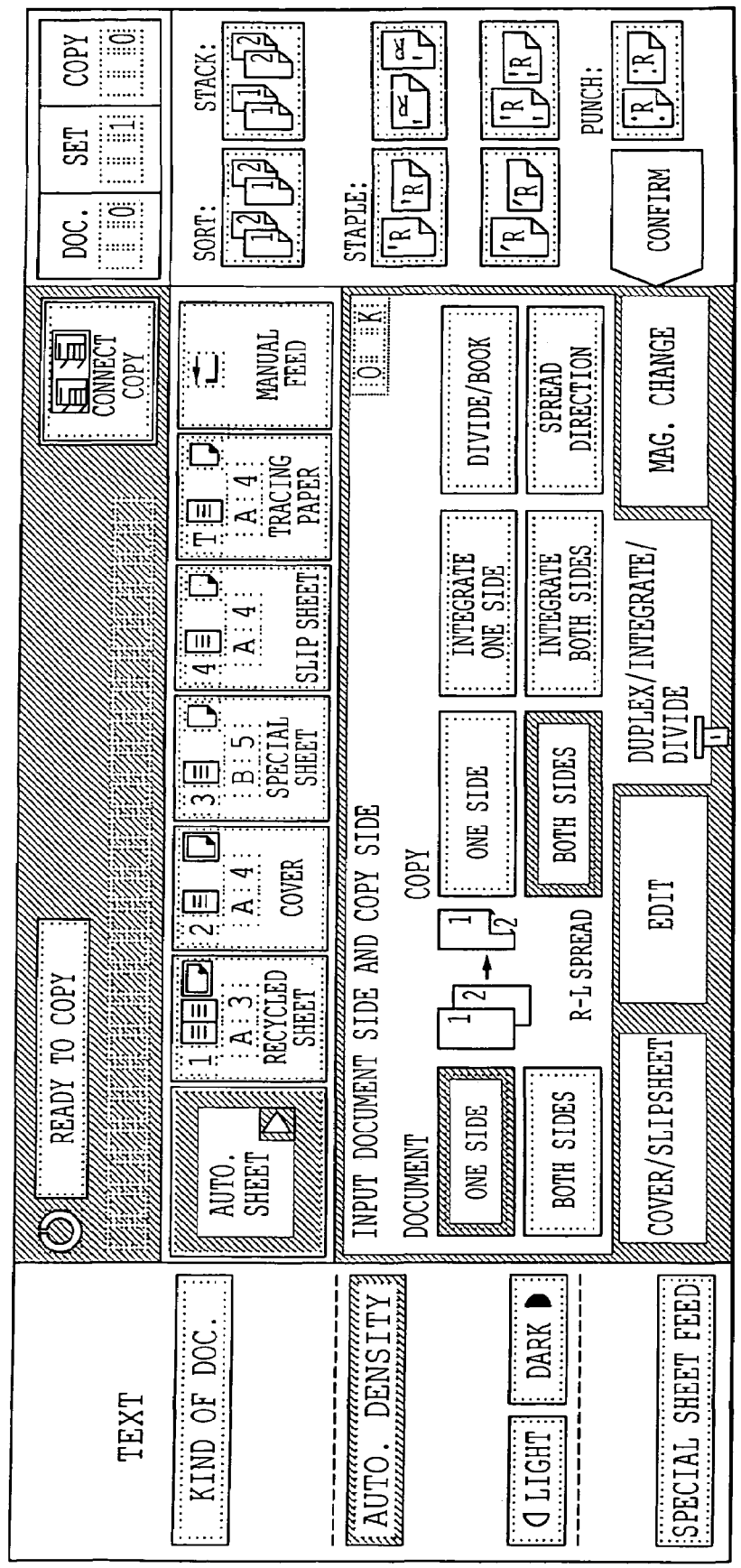
FIG. 18 shows a specific picture for selecting a duplex/integration/division function.
Figure 19:
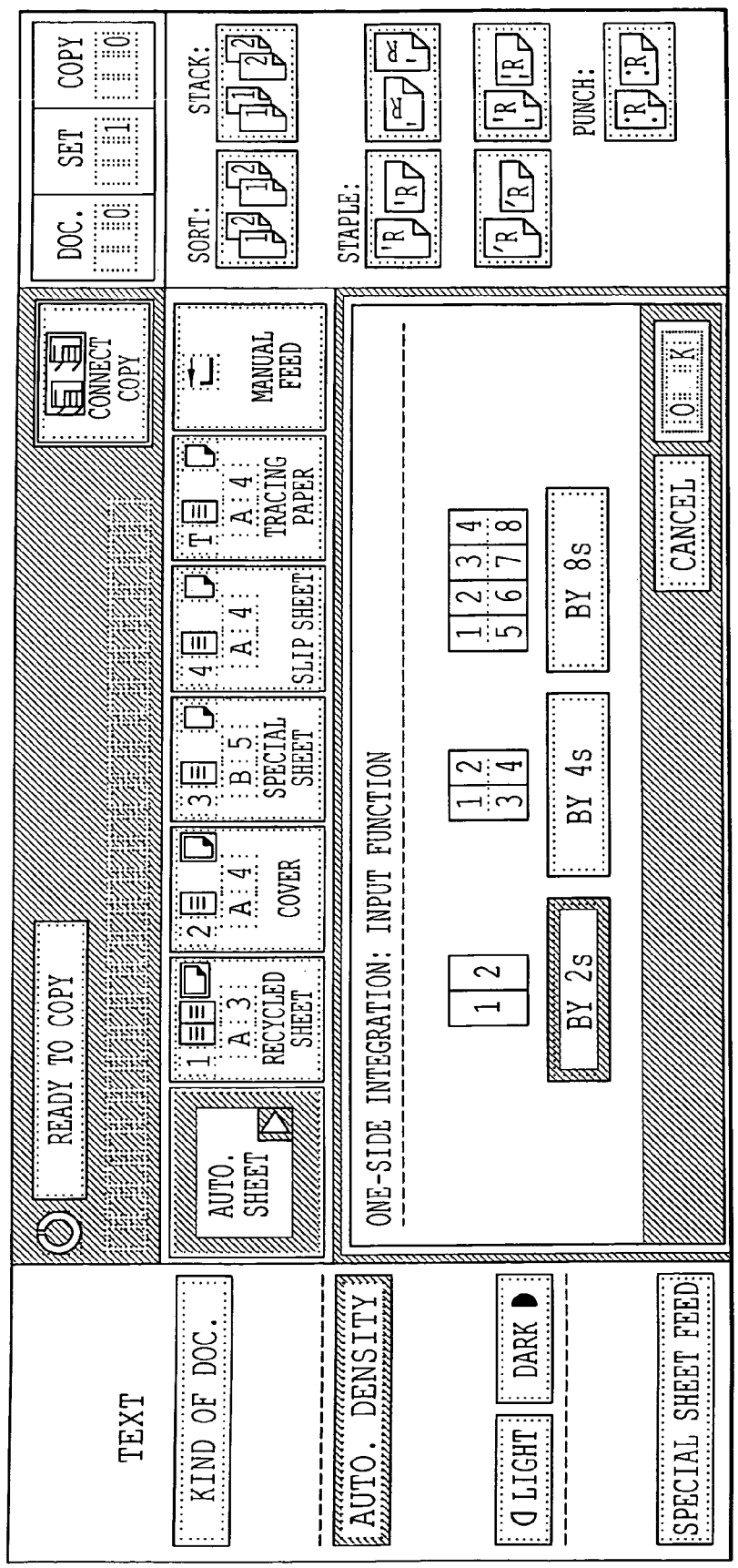
FIGS. 19-22 show specific pictures relating to the duplex/integration/division function.
Figure 20:
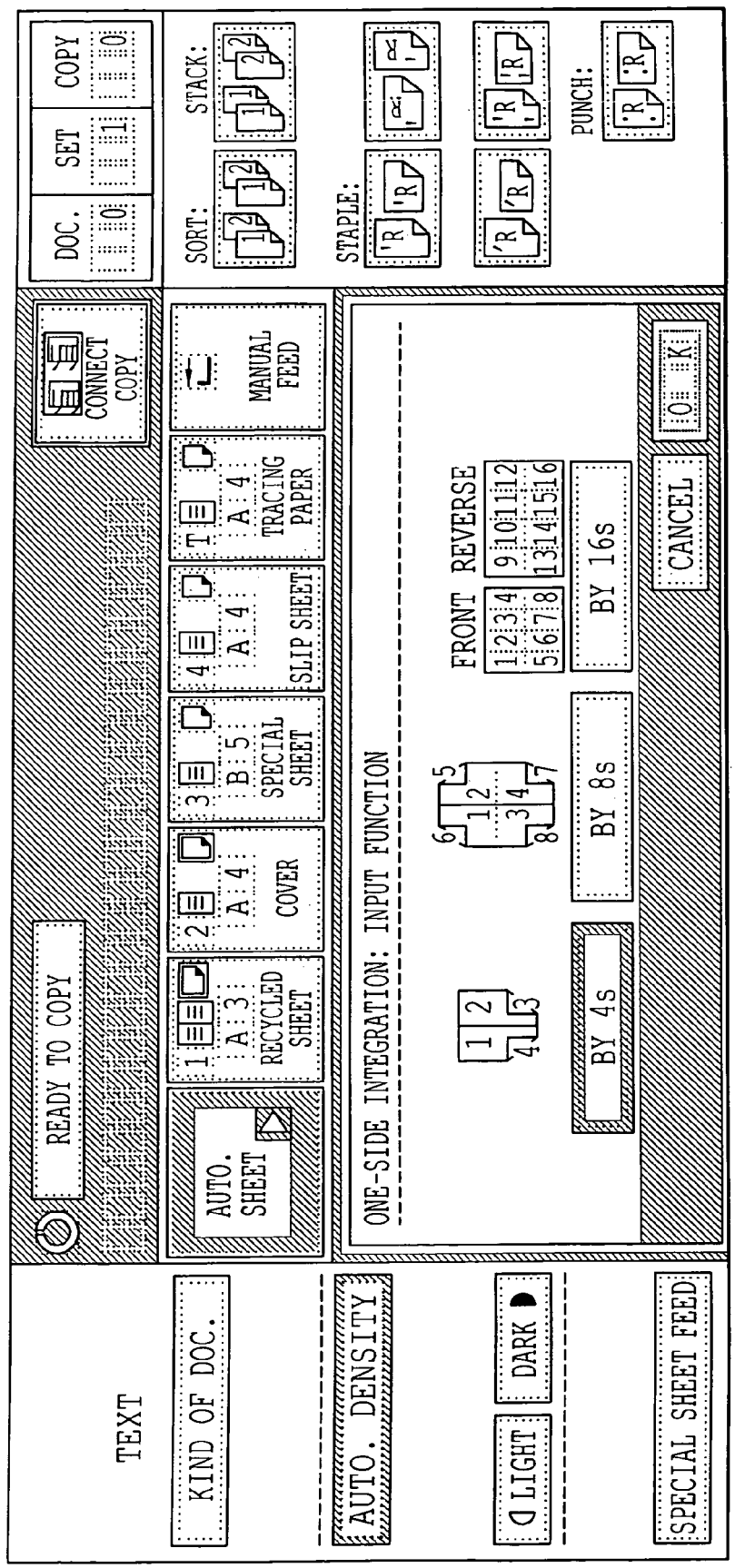
Figure 21:
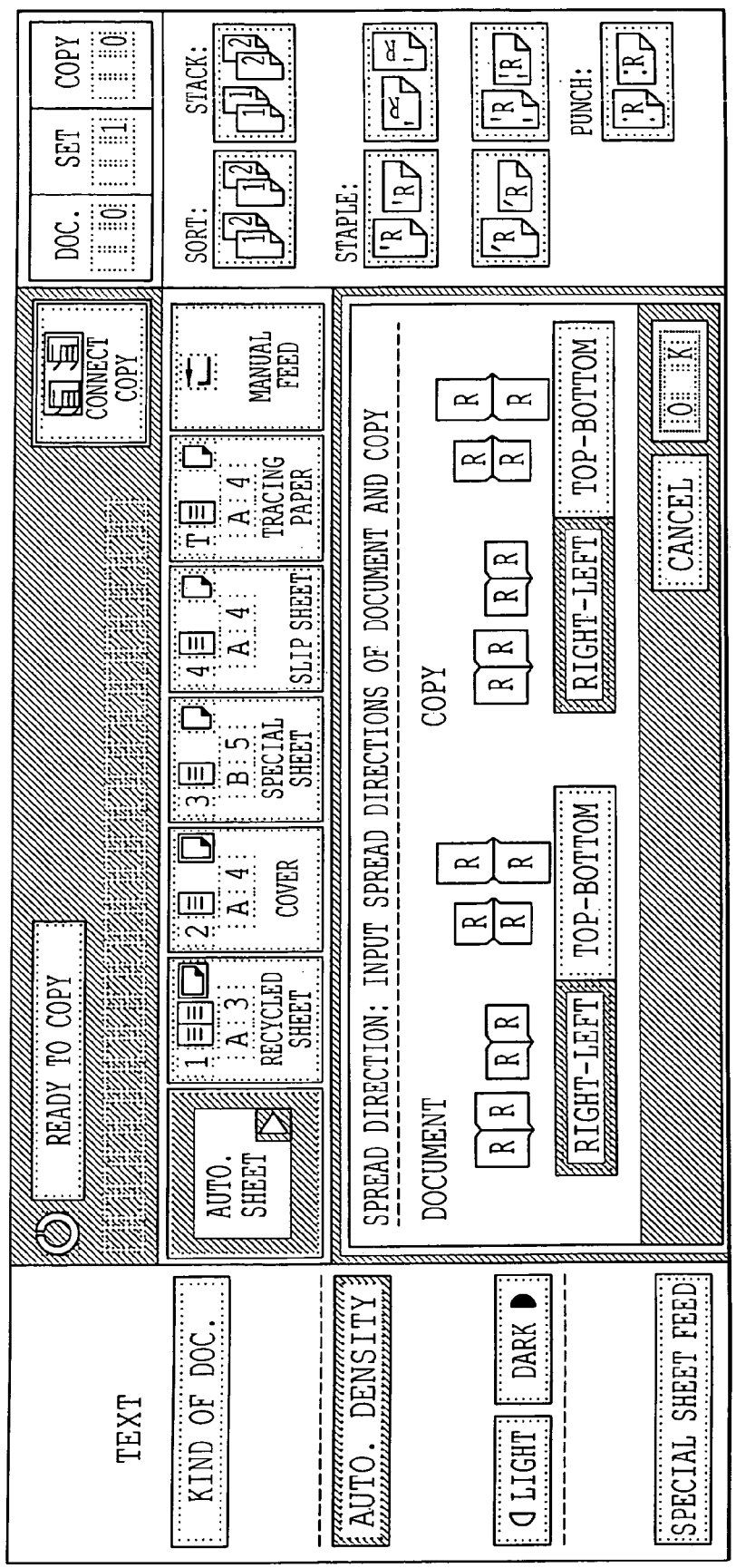

By suitably combining the setting of the sides of documents and the setting of the sides of copies, it is possible to effect duplex copying, integrated copying, and division copying, as desired. Specifically, when the "Duplex/Integration/Division" key is pressed, a picture shown in FIG. 18 appears. In a duplex copy mode, simplex documents may be copied on both sides of papers, or duplex documents may be copied on both sides of papers. If desired, a plurality of documents may be copied on a single paper. Specifically, FIG. 19 shows a picture to appear when a mode for copying each two pages of a document on one side of a paper is selected. FIG. 20 shows a specific picture in which a mode for copying each four pages of a document on both sides of a paper is selected. Further, FIG. 21 shows a picture for allowing the operator to select "Right/Left Spread" and "Top/Bottom Spread" for each of documents and copies.

Figure 22:
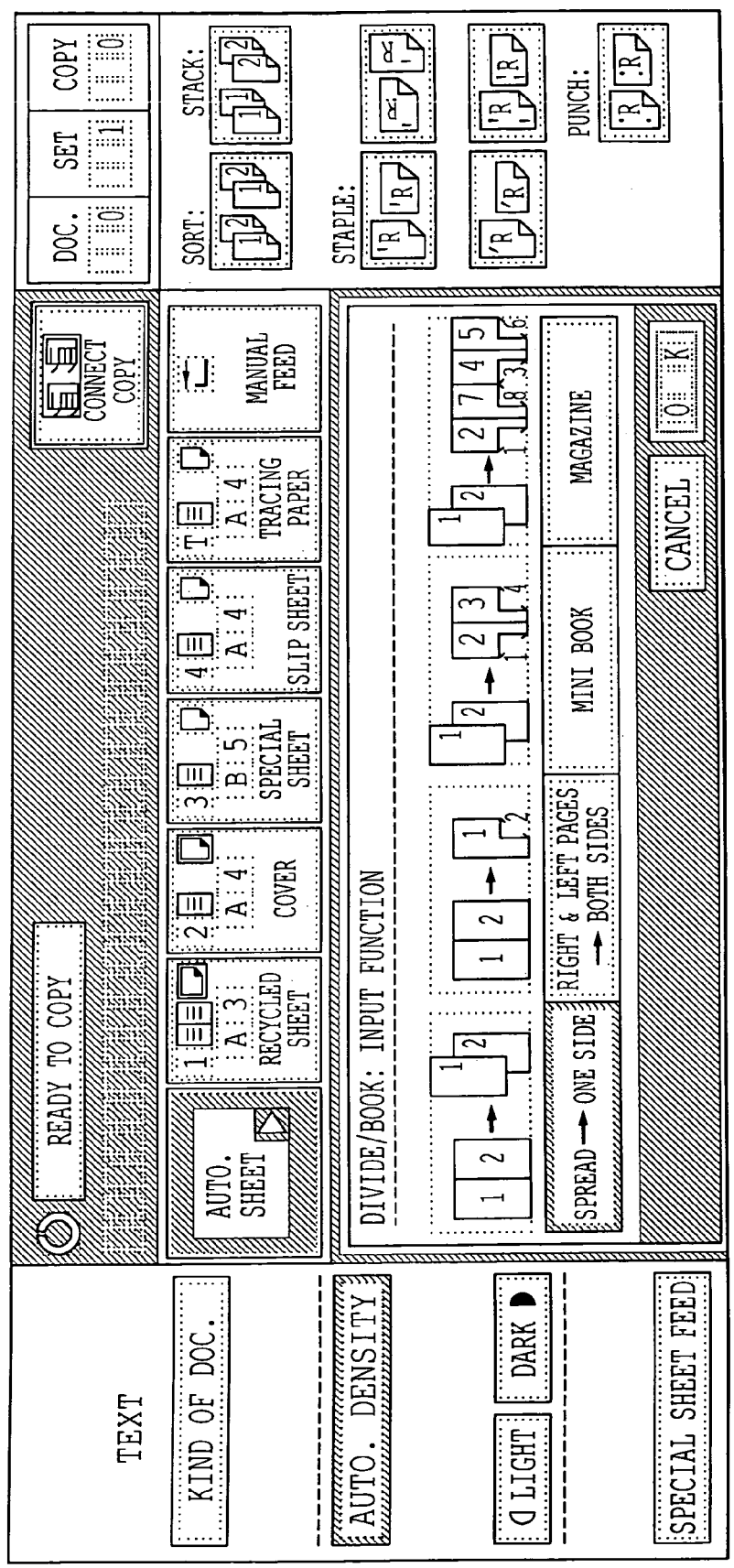

Division copying includes "Spread→Simplex" for copying the right and left pages of a spread document on one side of two papers, and "Duplex→Simplex" for copying both sides of a duplex document on one side of two papers. To select "Spread→Simplex", the operator touches a "Division/Book" key in the picture of FIG. 18. As a result, a picture shown in FIG. 22 appears. The operator touches an "OK" key in the picture of FIG. 22. To select "Duplex→Simplex", the operator presses a "Duplex" key of FIG. 18 assigned to documents, a "Simplex" key assigned to copies, and an "OK" key. A plurality of documents may be copied in order of page in the form of a book. This kind of copying includes "Right/Left Page Duplex" for copying a spread book on both sides of a paper, "Front/Rear Page Duplex" for copying a spread document on both sides of a paper in the same configuration as the document, "Mini Book" for copying four simplex documents in order of page, and "Magazine" for copying a plurality of documents in order of page (when folded and stacked). FIG. 22 shows a specific condition in which "Page Duplex Copy Priority" and "Right/Left Page Duplex" are selected. To select "Front/Rear Page Duplex", the initial setting is changed. If desired, "Right/Left" Page Duplex" and "Front/Rear Page Duplex" may be displayed together.

Figure 23:
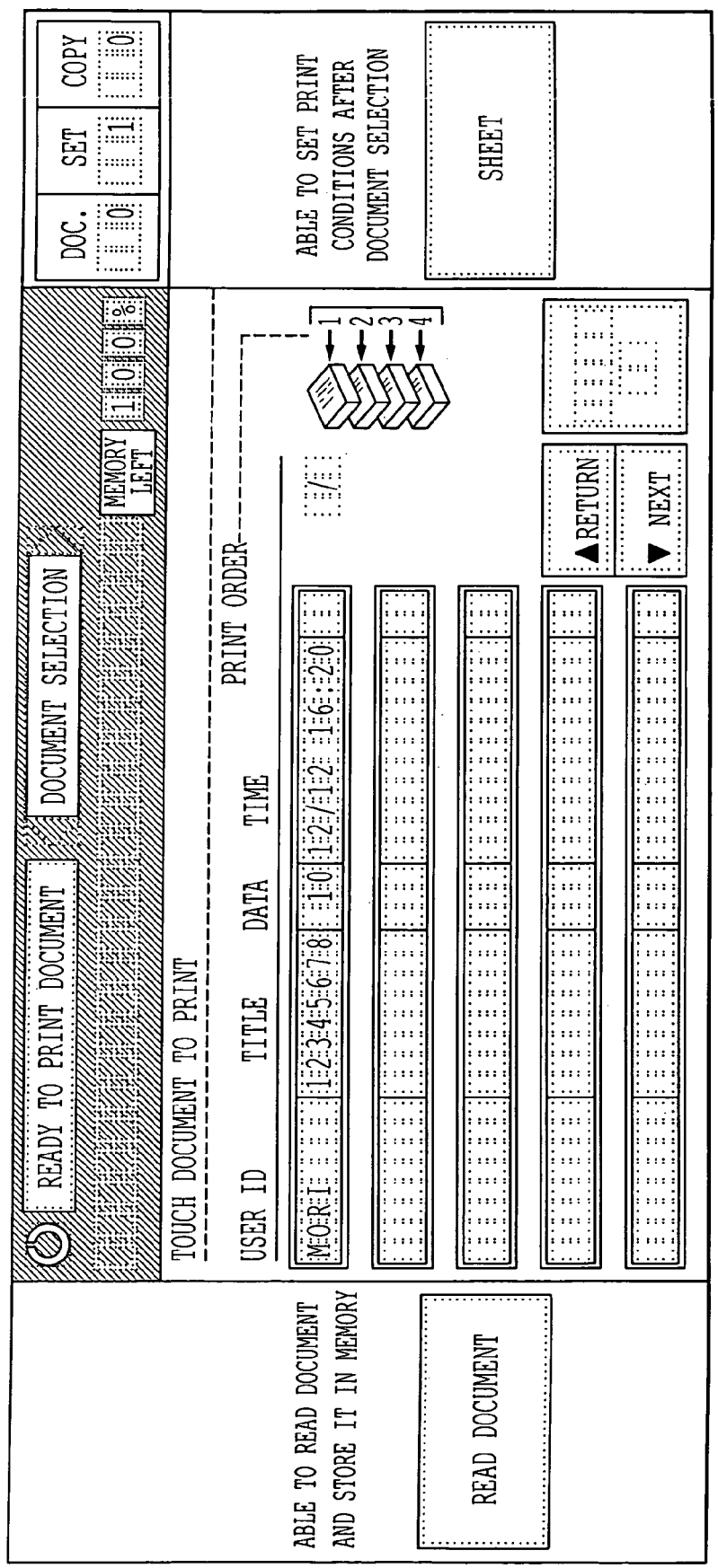
FIG. 23 shows a specific initial picture to appear on the screen when a stored file printing function is selected.
Figure 24:
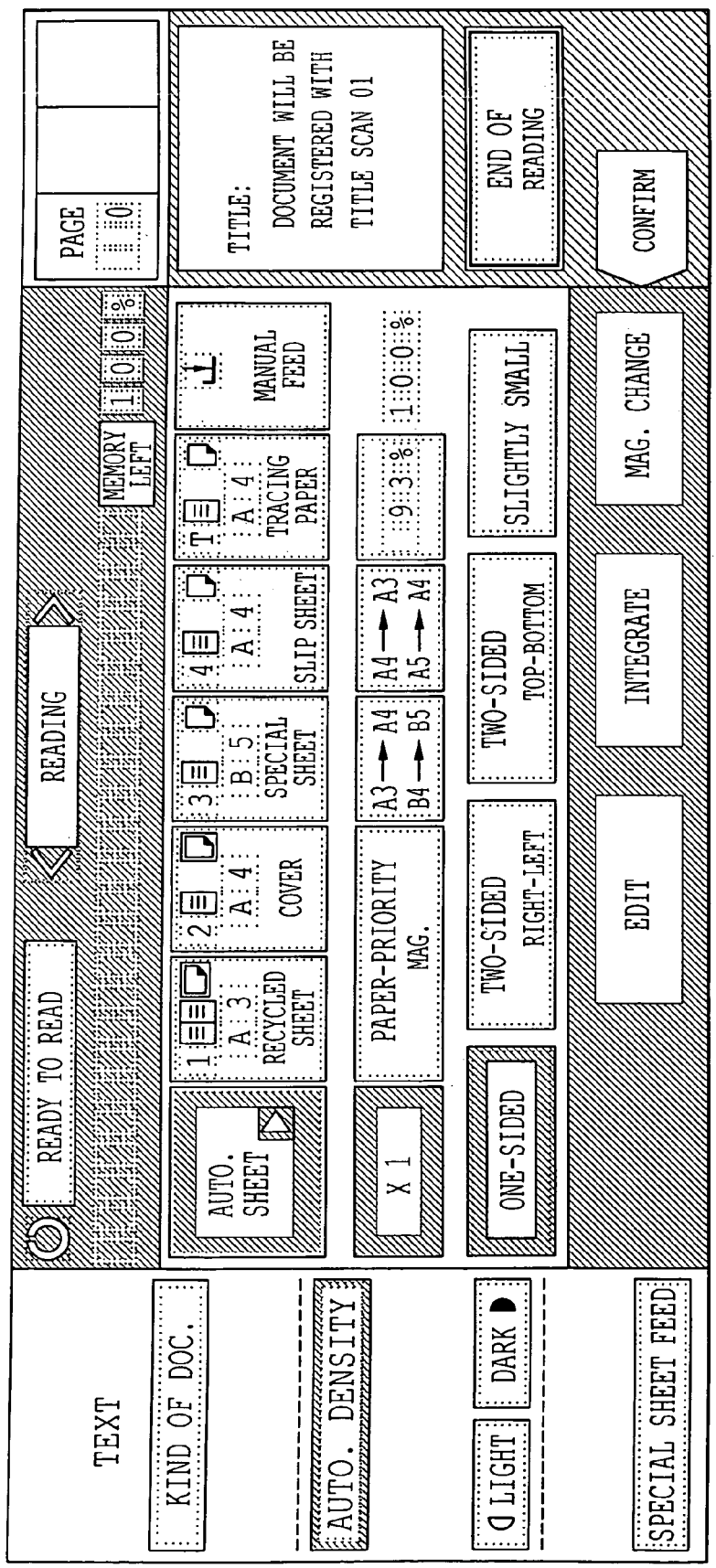
FIG. 24 shows a specific picture for reading documents to be stored.
Figure 25:
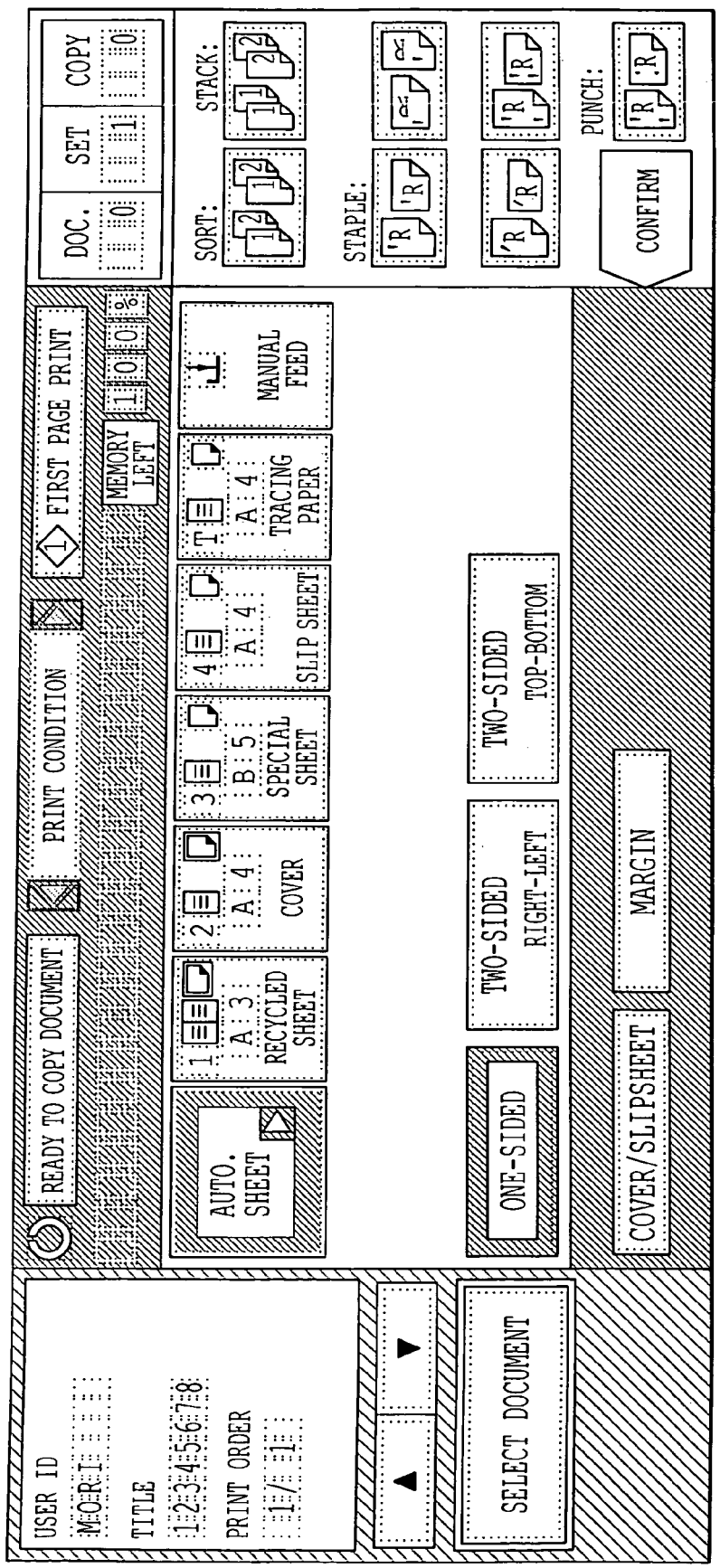
FIG. 25 shows a specific picture for setting conditions after the selection of a stored file.

FIG. 23 shows a picture to appear when the operator intending to store image data read in the apparatus in the form of a file and print them out presses the copy server key 91, FIG. 2. When the operator touches a "Document Read" key appearing in the first area 80a in FIG. 23, a picture shown in FIG. 24 appears. In FIG. 24, the first area 80a and sixth area 80f are identical with the corresponding areas of the basic picture assigned to copying. The operator sets reading conditions in the picture of in the above areas 80a and 80f and then causes the apparatus to read documents. Various functions available for reading documents are identical with the functions described in relation to copying and will not be described specifically in order to avoid redundancy. To print the stored file, the operator calls the picture shown in FIG. 23. Because a stored file is present, a "Print Condition" key in the fifth area 80 is highlighted. When the operator touches the "Print Condition" key, a picture shown in FIG. 25 appears. Then, the operator selects a document and sets desired printing conditions as in the copy mode operation.

In summary, it will be seen that the present invention provides a readable operation unit for an image forming apparatus displaying items representative of various functions relating to image formation while classifying and dividing them on a switchable screen. The operator can therefore easily understand the contents of operation in relation to the other functions despite that the functions are arranged in a hierarchical construction. Further, the operator can grasp the kind of image data and how the image data are processed and output as a single flow.

Various modifications will become possible for those skilled in the art after receiving the teachings of the present disclosure without departing from the scope thereof.

What is claimed is:

1. A method of controlling an image forming apparatus comprising the steps of:
    displaying an operation status message area on a first part of a touch panel display;
    displaying a document counting area configured to show a number of sheets set and a number of documents produced on a second part of the touch panel display;
    displaying an input document handling area on a third part of the touch panel display;
    allowing selection of at least one kind of input document for image forming from the input document handling area;
    displaying an output document handling area on a fourth part of the touch panel display, the fourth part of the touch panel display disposed directly below the second part of the touch panel display; and
    allowing selection of at least one of a sort mode, a stack mode, a staple mode, and a punch mode from the output document handling area.

2. The method as claimed in claim 1, further comprising the steps of:
    displaying at least one image forming function tab; and
    allowing selection of a program key to register the at least one image forming function tab.

3. The method as claimed in claim 2, further comprising the steps of:
    displaying a programmable registered image forming function tab area on a fifth part of the touch panel display; and allowing selection of at least one registered image forming function tab.

4. The method as claimed in claim 2, wherein the step of displaying an image forming function tab comprises: displaying at most ten image forming function tabs.

5. The method as claimed in claim 2, further comprising the steps of:
    displaying a programmable registered image forming function tab area on a fifth part of the touch panel display; and allowing selection of an automatic paper selecting function.

6. A method of controlling an image forming apparatus comprising the steps of:
    displaying an operation status message area on a first part of a touch panel display;
    displaying a document counting area configured to show a number of sheets set and a number of documents produced on a second part of the touch panel display;
    displaying an input document handling area on a third part of the touch panel display; and
    allowing selection of at least one kind of document for image forming from the input document handling area;
    displaying an output document handling area on a fourth part of the touch panel display, the fourth part of the touch panel display disposed directly below the second part of the touch panel display;
    allowing selection of at least one of a sort mode, a stack mode, a staple mode, and a punch mode from the output document handling area;
    displaying at least one image forming function tab;
    allowing selection of a program key to register the at least one image forming function tab;
    displaying a programmable registered image forming function tab area on a fifth part of the touch panel display; and
    allowing selection of at least one registered image forming function tab,
    wherein at least the input document handling area, the operation status message area, the document counting area, the output document handling area, and the programmable registered image forming function tab area are simultaneously maintained on the touch panel display while a selection is made via the touch panel display.

7. A method of controlling an image forming apparatus comprising the steps of:

displaying an operation status message area on a first part of a touch panel display;
displaying a document counting area configured to show a number of sheets set and a number of documents produced on a second part of the touch panel display;
displaying an input document handling area on a third part of the touch panel display;
allowing selection of at least one kind of input document for image forming;
displaying an output document handling area on a fourth part of the touch panel display, the fourth part of the touch panel display disposed directly below the second part of the touch panel display; and
allowing selection of at least one of a sort mode, a stack made, a staple mode, and a punch made from the output document handling area.

8. The method as claimed in claim 7, further comprising the steps of:
displaying at least one image forming function tab; and
allowing selection of a program key to register the at least one image forming function tab.

9. The method as claimed in claim 8, wherein the step of displaying an image forming function tab comprises: displaying at most ten image forming function tabs.

10. A method of controlling an image forming apparatus comprising the steps of:
displaying an operation status message area on a first part of a touch panel display;
displaying a document counting area configured to show a number of sheets set and a number of documents produced on a second part of the touch panel display;
displaying an input document handling area on a third part of the touch panel display; and
allowing selection of at least one kind of document for image forming from the input document handling area;
displaying an output document handling area on a fourth part of the touch panel display, the fourth part of the touch panel display disposed directly below the second part of the touch panel display;
allowing selection of at least one of a sort mode, a stack mode, a staple mode, and a punch mode from the output document handling area;
displaying at least one image forming function tab;
allowing selection of a program key to register the at least one image forming function tab;
displaying a programmable registered image forming function tab area on a fifth part of the touch panel display;
allowing selection of at least one registered image forming function tab; and
allowing operation in one of the five parts of the touch panel display,
wherein at least the input document handling area, the operation status message area, counting area, the output document handling area, programmable registered image forming function tab area are simultaneously maintained on the touch panel display while a selection is made via the touch panel display.

11. An operation and display section of an image forming apparatus, the operation and display section having a touch screen panel comprising:
a first touch screen panel subsection configured to control input processing of a document;
a second touch screen panel subsection configured to control copy processing of the document; and
a third touch screen panel subsection configured to control output processing of the document, the third touch screen panel subsection including a fourth and fifth touch screen panel subsections the fourth touch screen panel subsection configured to display a copy count and the fifth touch screen panel subsection configured to control selection of at least one of a sort mode, a stack mode, a staple mode, and a punch mode, the fourth touch screen panel subsection disposed directly above the fifth touch screen panel subsection.

12. The operation and display section as claimed in claim 11, wherein each touch screen panel subsection includes function keys that are configured to be selected to control processing in each subsection, and only information displayed in one of the touch screen panel subsections that includes selected function keys changes when the selected function keys are selected, while the display of the subsections not including the selected function keys are maintained on the touch screen panel.

13. The operation and display section as claimed in claim 11, wherein the first touch screen panel subsection includes input display keys configured to set document reading conditions.

14. The operation and display section as claimed in claim 11, wherein the third touch screen panel subsection includes output display keys configured to enable selection of an least one of a sort mode, a stack mode, a staple mode, and a punch mode.

15. The operation and display section as claimed in claim 11, wherein the first, second, and third touch screen panel subsection are horizontally arranged side by side on the touch screen panel in first, second and third touch screen panel order.

16. The operation and display section as claimed in claim 11, wherein the second touch screen panel subsection has a greater area than each of the first and third touch screen panel subsections.

17. A method of controlling an image forming apparatus comprising:
simultaneously maintaining at least an input document handling area, an operation status message area, a document counting area, an output document handling area, and a programmable registered image forming function tab area on a touch panel display while a selection is made via the touch panel display.

18. The method accordingly to claim 17, further comprising:
displaying an operation status message in the operation status message area;
displaying a number of sheets set and a number of documents produced in the document counting area; and
allowing selection of at least one kind of input document for image forming in the input document handling area.

19. The method according to claim 18, further comprising:
allowing selection of at least one of a sort mode, a stack mode, a staple mode, and a punch mode in the output document handling area.

20. The method according to claim 19, further comprising:
displaying at least one image forming function tab in the programmable registered image forming function tab area;
allowing selection of a program key to register the at least one image forming function tab; and
allowing selection of at least one registered image forming function tab.

21. The method according to claim 20, further comprising:
wherein displaying at least one image forming function tab comprises displaying at most ten image forming function tabs.

22. A method of controlling an image forming apparatus comprising:
   simultaneously maintaining at least an input document handling area, an operation status message area, a document counting area, an output document handling area, and a programmable registered image forming function tab area on a touch panel display while a selection is made via the touch panel display; and
   allowing operation in one of five parts of the touch panel display.

23. The method accordingly to claim 22, further comprising:
   displaying an operation status message in the operation status message area;
   displaying a number of sheets set and a number of documents produced in the document counting area; and
   allowing selection of at least one kind of input document for image forming in the input document handling area.

24. The method according to claim 23, further comprising:
   allowing selection of at least one of a sort mode, a stack mode, a staple mode, and a punch mode in the output document handling area.

25. The method according to claim 24, further comprising:
   displaying at least one image forming function tab in the programmable registered image forming function tab area;
   allowing selection of a program key to register the at least one image forming function tab; and
   allowing selection of at least one registered image forming function tab.

26. The method according to claim 25, further comprising:
   wherein displaying at least one image forming function tab comprises displaying at most ten image forming function tabs.

27. An image forming apparatus including an operation and display section, the operation and display section having a touch screen panel comprising:
   an input document handling area;
   an operation status message area;
   a document counting area;
   an output document handling area, the output document handling area disposed directly below the document counting area; and
   a programmable registered image forming function tab area,
   wherein each area is simultaneously maintained on the touch panel display while a selection is made via the touch panel display.

28. The image forming apparatus according to claim 27, wherein
   the input document handling area is configured to allow selection of at least one kind of input document for image forming,
   the operation status message area is configured to display an operation status message, and
   the document counting area is configured to display a number of sheets set and a number of documents produced.

29. The image forming apparatus according to claim 28, wherein
   the output document handling area is configured to allow selection of at least one of a sort mode, a stack mode, a staple mode, and a punch mode.

30. The image forming apparatus according to claim 29, wherein
   a programmable registered image forming function tab area is configured to display at least one image forming function tab, allow selection of a program key to register the at least one image forming function tab and allow selection of the at least one registered image forming function tab.

31. An image forming apparatus including an operation and display section, the operation and display section having a touch screen panel including comprising:
   an input document handling area;
   an operation status message area;
   a document counting area;
   an output document handling area, the output document handling area disposed directly below the document counting area; and
   a programmable registered image forming function tab area,
   wherein each area is simultaneously maintained on the touch panel display while a selection is made via the touch panel display and an operation is allowed in one of the areas of the touch panel display.

32. The image forming apparatus according to claim 31, wherein
   the input document handling area is configured to allow selection of at least one kind of input document for image forming,
   the operation status message area is configured to display an operation status message, and
   the document counting area is configured to display a number of sheets set and a number of documents produced.

33. The image forming apparatus according to claim 32, wherein
   the output document handling area is configured to allow selection of at least one of a sort mode, a stack mode, a staple mode, and a punch mode.

34. The image forming apparatus according to claim 33, wherein
   a programmable registered image forming function tab area is configured to display at least one image forming function tab, allow selection of a program key to register the at least one image forming function tab and allow selection of the at least one registered image forming function tab.

* * * * *